United States Patent
Takahashi et al.

(10) Patent No.: US 10,208,559 B2
(45) Date of Patent: Feb. 19, 2019

(54) DIAMETER-EXPANDABLE ANNULAR DEGRADABLE SEAL MEMBER FOR DOWNHOLE TOOL, PLUG FOR WELL DRILLING, AND METHOD FOR WELL DRILLING

(71) Applicant: Kureha Corporation, Tokyo (JP)

(72) Inventors: Takeo Takahashi, Tokyo (JP); Masayuki Okura, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 214 days.

(21) Appl. No.: 15/037,506

(22) PCT Filed: Dec. 24, 2014

(86) PCT No.: PCT/JP2014/084045
§ 371 (c)(1),
(2) Date: May 18, 2016

(87) PCT Pub. No.: WO2015/098913
PCT Pub. Date: Jul. 2, 2015

(65) Prior Publication Data
US 2016/0298415 A1    Oct. 13, 2016

(30) Foreign Application Priority Data
Dec. 27, 2013 (JP) .................... 2013-271310
Jun. 20, 2014 (JP) .................... 2014-127561

(51) Int. Cl.
*E21B 33/128*    (2006.01)
*E21B 33/12*     (2006.01)
(Continued)

(52) U.S. Cl.
CPC .......... *E21B 33/1208* (2013.01); *C09J 167/00* (2013.01); *E21B 33/128* (2013.01); *E21B 43/26* (2013.01); *C09K 8/426* (2013.01)

(58) Field of Classification Search
CPC .. E21B 33/1208; E21B 33/1285; E21B 33/12; E21B 33/1216; E21B 33/126;
(Continued)

(56) References Cited

U.S. PATENT DOCUMENTS 4,766,167 A    8/1988  Marnett et al.
4,924,941 A    5/1990  Farley
(Continued)

FOREIGN PATENT DOCUMENTS

CA    2868975 A1    12/2013
CN    1420972 A      5/2003
(Continued)

OTHER PUBLICATIONS

Non-Final Office Action dated Oct. 10, 2017, in copending U.S. Appl. No. 15/123,857.
(Continued)

*Primary Examiner* — Zakiya W Bates
(74) *Attorney, Agent, or Firm* — Birch, Stewart, Kolasch & Birch, LLP

(57) ABSTRACT

A degradable seal member for downhole tools, the member being a diameter-expandable annular seal member, the diameter-expandable annular seal member comprising: two or more annular members distributed along an axial direction, the annular members being formed from a degradable polymer material having hardness in a range from A60 to D80; a plug for well drilling; and a method for well drilling using the degradable seal member for downhole tools.

20 Claims, 1 Drawing Sheet

(51) Int. Cl.
*C09J 167/00* (2006.01)
*E21B 43/26* (2006.01)
*C09K 8/42* (2006.01)

(58) Field of Classification Search
CPC ....... E21B 33/128; C09K 8/035; C09K 8/508; C09K 8/426
See application file for complete search history.

(56) References Cited

U.S. PATENT DOCUMENTS

| | | | |
|---|---|---|---|
| 6,409,175 | B1 | 6/2002 | Evans et al. |
| 7,237,610 | B1 | 7/2007 | Saini et al. |
| 8,887,816 | B2 | 11/2014 | Liang et al. |
| 8,899,317 | B2 | 12/2014 | Frazier |
| 2003/0060375 | A1 | 3/2003 | Grainger et al. |
| 2005/0011648 | A1 | 1/2005 | Nguyen et al. |
| 2005/0205265 | A1 | 9/2005 | Todd et al. |
| 2005/0205266 | A1 | 9/2005 | Todd et al. |
| 2006/0113077 | A1 | 6/2006 | Willberg et al. |
| 2006/0169453 | A1 | 8/2006 | Savery et al. |
| 2006/0283591 | A1 | 12/2006 | Willberg et al. |
| 2007/0169935 | A1 | 7/2007 | Akbar et al. |
| 2007/0277979 | A1 | 12/2007 | Todd et al. |
| 2008/0182924 | A1 | 7/2008 | Morimoto et al. |
| 2008/0200352 | A1 | 8/2008 | Willberg et al. |
| 2008/0224413 | A1 | 9/2008 | Doane et al. |
| 2008/0289823 | A1 | 11/2008 | Willberg et al. |
| 2009/0242214 | A1 | 10/2009 | Foster et al. |
| 2010/0132959 | A1 | 6/2010 | Tinker |
| 2010/0139930 | A1 | 6/2010 | Patel et al. |
| 2011/0067889 | A1 | 3/2011 | Marya et al. |
| 2011/0132611 | A1 | 6/2011 | Rytlewski et al. |
| 2011/0196125 | A1 | 8/2011 | Wann |
| 2011/0277989 | A1 | 11/2011 | Frazier |
| 2012/0035309 | A1 | 2/2012 | Zhu et al. |
| 2012/0067581 | A1 | 3/2012 | Auzerais et al. |
| 2012/0085548 | A1 | 4/2012 | Fleckenstein et al. |
| 2013/0025859 | A1 | 1/2013 | Liang et al. |
| 2013/0183363 | A1 | 7/2013 | Polaschegg |
| 2013/0233546 | A1 | 9/2013 | Liang et al. |
| 2013/0237637 | A1 | 9/2013 | Katou et al. |
| 2013/0240203 | A1 | 9/2013 | Frazier |
| 2013/0292123 | A1 | 11/2013 | Murphree et al. |
| 2014/0190685 | A1 | 7/2014 | Frazier et al. |
| 2015/0051119 | A1 | 2/2015 | Masaki et al. |
| 2015/0096741 | A1 | 4/2015 | Okura et al. |
| 2015/0292292 | A1 | 10/2015 | Okura et al. |
| 2015/0361326 | A1 | 12/2015 | Masaki et al. |
| 2016/0108696 | A1 | 4/2016 | Okura et al. |
| 2016/0177655 | A1 | 6/2016 | Fripp et al. |

FOREIGN PATENT DOCUMENTS

| | | |
|---|---|---|
| CN | 101240088 A | 8/2008 |
| CN | 101273183 A | 9/2008 |
| CN | 103497386 A | 1/2014 |
| JP | 11-60928 A | 3/1999 |
| JP | 2000-319446 A | 11/2000 |
| JP | 2003533619 A | 11/2003 |
| JP | 2012-12560 A | 1/2012 |
| PL | 221753 B1 | 5/2016 |
| WO | WO 2010/039131 A1 | 4/2010 |
| WO | WO 2013/132002 A1 | 9/2013 |
| WO | WO 2013/162002 A1 | 10/2013 |
| WO | WO2013183363 A1 | 12/2013 |
| WO | WO 2014/010267 A1 | 1/2014 |
| WO | WO 2014/112479 A1 | 7/2014 |

OTHER PUBLICATIONS

Notification of First Office Action dated Jun. 8, 2017, in Chinese Patent Application No. 201480055144.5, with English translation.
Chinese Office Action and Search Report, dated Feb. 26, 2018, for Chinese Application No. 201580010065.7, as well as an English translation.
U.S. Office Action, dated Feb. 9, 2018, for U.S. Appl. No. 15/123,857.
Canadian Office Action and Search Report, dated Dec. 8, 2017, for Canadian Application No. 2,931,349.
Japanese Notication of Reasons for Rejection, dated Jan. 9, 2018, for Japanese Application No. 2014-127561, with an English translation.
Japanese Notification of Reasons for Rejection, dated Dec. 26, 2017, for Japanese Application No. JP-2014-047564, with an English translation.
Chinese Office Action and Search Report, dated Jan. 26, 2017, for Chinese Application No. 201580005658.4, with English translations.
Chinese Office Action, dated Jun. 29, 2017, for Chinese Application No. 201580005658.4, with an English translation.
Database WPI, Week 201418, Thomson Scientific, London, GB; AN 2014-E38537; XP002767496 (CN 103 497 386 A, Jan. 8, 2014, Abstract).
Database WPI, Week 201442, Thomson Scientific, London, GB; AN 2014-L91484; XP002767495 (PL 399 156 A1, Nov. 25, 2013, Abstract).
English translation of the International Search Report (form PCT/ISA/210), dated May 19, 2015, for International Application No. PCT/JP2015/055959.
English translation of the International Search Report, dated May 26, 2015 (form PCT/ISA210), for International Application No. PCT/JP2015/056419.
Extended European Search Report and Supplementary European Search Report, dated Mar. 3, 2017, for European Patent Application No. 15757709.9.
International Preliminary Report on Patentability and English translation of the Written Opinion of the International Searching Authority (forms PCT/IB/373, PCT/ISA/237 and PCT/IB/338), dated Sep. 22, 2016, for International Application No. PCT/JP2015/056419.
U.S. Office Action, dated Jul. 28, 2017, for U.S. Appl. No. 15/118,210.
English translation of International Preliminary Report on Patentability dated Jul. 7, 2016, in PCT International Application No. PCT/JP2014/084045.
Canadian Office Action for Canadian Application No. 2,931,349, dated Mar. 22, 2017.
Decision of Rejection dated Oct. 23, 2017, in Chinese Patent Application No. 201580005658.4, with English translation.
International Search Report of PCT/JP2014/084045 dated Mar. 31, 2015.
Advisory Action dated Apr. 11, 2018, in U.S. Appl. No. 15/123,857.
Second Office Action dated Mar. 20, 2018, in Chinese Patent Application No. 201480055144.5, with English translation.
Office Action dated Jul. 9, 2018, in U.S. Appl. No. 15/123,857.
Chinese Office Action, dated Sep. 25, 2018 for corresponding Chinese Application No. 201480055144.5, with English translation.
Chinese Office Action and Search Report dated Oct. 19, 2018 for Application No. 201580010065.7, along with English translations.
European Patent Office Communication pursuant to Article 94(3) EPC issued in the European Patent Application No. 15 757 709.9 dated Dec. 5, 2018.

DIAMETER-EXPANDABLE ANNULAR DEGRADABLE SEAL MEMBER FOR DOWNHOLE TOOL, PLUG FOR WELL DRILLING, AND METHOD FOR WELL DRILLING

TECHNICAL FIELD

The present invention relates to a degradable seal member for downhole tools such as a plug for well drilling used in well drilling for producing hydrocarbon resources such as petroleum or natural gas; a plug for well drilling; and a method for well drilling.

BACKGROUND ART

Hydrocarbon resources such as petroleum or natural gas have come to be produced by excavation through wells (oil wells or gas wells, also collectively called "wells") having a porous and permeable subterranean formation.

As energy consumption increases, deeper wells are being drilled, reaching depths greater than 9,000 m worldwide and greater than 6,000 m in Japan.

In wells that are continuously excavated, the productive layer is stimulated in order to continuously excavate hydrocarbon resources efficiently from subterranean formations of which permeability has decreased over time and subterranean formations of which permeability is insufficient from the beginning. Known stimulation methods include acid treatment and fracturing methods (Patent Document 1).

Acid treatment is a method in which the permeability of the productive layer is increased by injecting a mixture of strong acids such as hydrochloric acid and hydrofluoric acid into the productive layer and dissolving the reaction components of bedrock (carbonates, clay minerals, silicates, and the like). However, various problems that accompany the use of strong acids have been identified, and increased costs, including various countermeasures, have also been pointed out.

Thus, methods for forming cracks (fractures) in the productive layer using fluid pressure (also called "fracturing" or "hydraulic fracturing") have received attention.

Hydraulic fracturing is a method in which fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures are produced by the hydraulic pressure in the deep subterranean productive layer (layer that produces the hydrocarbon resource such as petroleum or natural gas), and the productive layer is thereby stimulated in order to extract the hydrocarbon resource through the fractures.

The efficacy of hydraulic fracturing has also been examined for the development of unconventional resources such as shale oil (oil that matures in shale) and shale gas.

Fractures formed by fluid pressure such as hydraulic pressure immediately close due to formation pressure when the hydraulic pressure is no longer applied.

To prevent a fracture from closure, a proppant is included in the fracturing fluid (that is, the well treatment fluid used in fracturing), which is fed into the borehole, thereby distributing the proppant in the fracture.

Inorganic or organic materials are used as proppants included in fracturing fluid, but silica, alumina, and other inorganic particles have been conventionally used, and sand particles such as 20/40-mesh have been widely used because they are capable of preventing fracture closure in a very deep subterranean environment under high-temperature and high-pressure for a long time.

Various types of water-based fluids, oil-based fluids, and emulsions are used as well treatment fluids such as fracturing fluid.

Because the well treatment fluid needs to have the function of transporting the proppant to the location where the fracture is generated in the borehole, it generally needs to have a prescribed viscosity, good proppant dispersibility, ease of after-treatment, and low environmental load.

Furthermore, fracturing fluid sometimes contains a channelant in order to form flow paths through which shale oil, shale gas, and the like can pass among the proppant.

Accordingly, in addition to the proppant, various additives are used in well treatment fluid, such as channelants, gelling agents, antiscale agents, acids for dissolving rock and the like, friction-reducing agents, and the like.

The following method is typically used to produce fractures by hydraulic pressure in the productive layer of a deep subterranean formation (layer that produces the hydrocarbon resource such a petroleum such as shale oil or natural gas such as shale gas) using fracturing fluid.

Specifically, fracturing is performed by partially plugging a prescribed section of a borehole (downhole) drilled into a subterranean formation several thousand meters deep while isolating sequentially from the tip portion of the borehole, and feeding fracturing fluid at high pressure into the plugged section to produce fractures in the productive layer.

Then, the next prescribed section (typically ahead of the preceding section, i.e., a section closer to the ground surface) is plugged and fracturing is performed.

After that, this process is repeated until the required isolation and fracturing have been completed.

Stimulation of the productive layer is sometimes also performed again by fracturing not only for drilling of new wells but for desired sections of boreholes that have already been formed.

In this case as well, the operations of borehole plugging, fracturing, and the like are similarly repeated.

Additionally, there are also cases where, to perform completion of the well, the borehole is plugged to block fluid from below, and after finishing of the top portions thereof is performed, the plugging is released.

Various methods are known for plugging and fracturing of boreholes, and Patent Documents 2 and 3 disclose plugs that can plug or fix a borehole (also called a "frac plug," "bridge plug," "packer," or the like).

Patent Document 2 discloses a downhole plug for well drilling (also called "plug for well drilling" or simply "plug" hereinafter), and specifically discloses a plug comprising a mandrel (main body) having a hollow part in the axial direction, a ring or annular member along the axial direction on the outer circumferential surface orthogonal to the axial direction of the mandrel, a first conical member and slip, a malleable element formed from elastomer, rubber, or the like, a second conical member and slip, and an anti-rotation feature.

Plugging of the borehole by this plug for well drilling is performed as follows.

Specifically, by moving the mandrel in the axial direction, as the gap between the ring or annular member and the anti-rotation feature gets smaller, the slip contacts the slanted face of the conical member and proceeds along the conical member, thereby moving so as to expand radially, and then the tip of the slip comes into contact with the inner wall of the borehole and is fixed in the borehole, and also, the malleable element deforms by diametric expansion as the distance in the axial direction shrinks, and comes into contact with the inner wall of the borehole to seal the borehole.

It is described that metal materials (aluminum, steel, stainless steel, and the like), fibers, wood, composite materials, plastics, and the like are widely exemplified as materials that form plugs, and that composite materials containing a reinforcing material such as carbon fibers, especially polymer composite materials of epoxy resin, phenol resin, and the like, are preferred, and that the mandrel is formed from aluminum or a composite material.

Plugs for well drilling are arranged sequentially inside a borehole until the well is completed, but at the stage when production of petroleum such as shale oil or natural gas such as shale gas (sometimes collectively called "petroleum and natural gas" hereinafter) is begun, the plugging of the borehole by the slip, which is a member of the plug for well drilling, and by the diameter-expandable annular seal member needs to be released and the plug needs to be removed.

Because the plug is typically not designed to be retrievable after use and release of plugging, it is removed by destruction or by making it into small fragments by fracturing, perforation, or another method, but substantial cost and time are required for fracturing, perforation, and the like.

There are also plugs specially designed to be retrievable after use (retrievable plugs), but since plugs are placed deep underground, substantial cost and time are required to retrieve all of them.

Patent Document 3 discloses a disposable downhole tool (meaning a downhole plug or the like) or a member thereof containing a biodegradable material that degrades when exposed to the environment inside a well, and as the biodegradable material, discloses a degradable polymer such as an aliphatic polyester such as polylactic acid.

Additionally, Patent Document 3 describes a combination of a tubular body element having an axial-direction flow bore, a packer element assembly formed of an upper sealing element, a center sealing element, and a lower sealing element along the axial direction on the outer circumferential surface orthogonal to the axial direction of the tubular body element, a slip, and a mechanical slip body.

Furthermore, Patent Document 3 discloses that fluid flow in only one direction is allowed due to the fact that a ball is set in the flow bore of the tubular body part.

However, Patent Document 3 does not disclose whether a material containing a biodegradable material is used for a downhole tool or any part thereof.

Based on increased demands such as securement of energy resources and environmental protection, and particularly due to the fact that excavation conditions have become more harsh and diverse, such as increased depth, while excavation of unconventional resources is expanding, for downhole tools such as plugs for well drilling there has been a demand for a seal member for downhole tools, a plug for well drilling, and a method for well drilling that can reliably seal a borehole to withstand the high fluid pressure of fracturing and the like, and that is easy to remove and makes it easy to secure a flow path, thereby reducing expense and shortening processes of well drilling.

CITATION LIST

Patent Literature

Patent Literature 1: Japanese Unexamined Patent Application Publication (Translation of PCT Application) No. 2003-533619A (corresponding to WO/01/088333)

Patent Literature 2: US Patent Application Publication No. 2011/0277989 A1 specification Patent Literature 3: US Patent Application Publication No. 2005/0205266 A1 specification

SUMMARY OF INVENTION

Technical Problem

A first aspect of the object of the present invention is to provide a degradable seal member for downhole tools which, based on the fact that excavation conditions have become more harsh and diverse such as increased depth, can perform sealing in downholes used in many applications, such as reliable sealing of boreholes to withstand the high fluid pressure of fracturing and the like, and that is easy to remove and makes it easy to secure a flow path, thereby reducing expense and shortening processes of well drilling.

Another aspect of the object of the present invention is to provide a plug for well drilling.

Yet another aspect of the object of the present invention is to provide a method for well drilling using the seal member.

Solution to Problem

As a result of diligent research to solve the above problems, the present inventors discovered that the problem can be solved by means of a diameter-expandable annular seal member having a specific structure and properties in a plug for well drilling comprising a mandrel and at least one diameter-expandable annular seal member disposed on the outer circumferential surface orthogonal to the axial direction of the mandrel and achieved the present invention.

Specifically, the present invention provides (1) a degradable seal member for downhole tools, the member being a diameter-expandable annular seal member, the diameter-expandable annular seal member comprising: two or more annular members distributed along an axial direction, the annular members being formed from a degradable polymer material having hardness in a range from A60 to D80.

According to a first aspect of the present invention, degradable seal members for downhole tools of (2) to (18) below are provided as specific aspects of the invention.

(2) The degradable seal member for downhole tools according to the above (1), wherein, in each of the polymer materials that form the two or more annular members, a difference in time taken for a decrease in 50% strain compressive stress of 50% strain compressive stress after immersion in 150° C. water relative to a 50% strain compressive stress before immersion to be not less than 5% is within 2 days.

(3) The degradable seal member for downhole tools according to the above (1) or (2), wherein a loss rate of mass of the polymer material that forms annular members after immersion for 72 hours in 150° C. water relative to a mass before immersion is from 5 to 100%.

(4) The degradable seal member for downhole tools according to any one of the above (1) to (3), wherein the polymer material that forms annular members is stable in a dry environment, and a decrease of 50% strain compressive stress after immersion for 6 hours in 23° C. water relative to a 50% strain compressive stress after immersion for 1 hour is less than 5%.

(5) The degradable seal member for downhole tools according to any one of the above (1) to (4), wherein the annular members have a tensile fracture strain at 66° C. of not less than 50%, a 70% strain compressive stress of not less than 10 MPa, and a compressive fracture strain of not less than 50%.

(6) The degradable seal member for downhole tools according to any one of the above (1) to (5), wherein the annular members have a ratio of compressive stress at 70% compressive strain relative to a compressive stress at 5% compressive strain at 66° C. of not less than 5:1.

(7) The degradable seal member for downhole tools according to any one of the above (1) to (6), wherein a diameter-expandable annular seal member is disposed on an outer circumferential surface orthogonal to an axial direction of a mandrel, and at least one annular member expands in diameter due to compression in an axial direction and plugs a gap between an inner wall of a downhole and the diameter-expandable annular seal member, and at least one other annular member has a function of blocking fluid by plugging a gap between the mandrel and the diameter-expandable annular seal member.

(8) The degradable seal member for downhole tools according to any one of the above (1) to (7), wherein the degradable polymer material contains at least one rubber material selected from the group consisting of urethane rubber, acrylic rubber, polyester-based thermoplastic elastomer, polyamide-based thermoplastic elastomer, natural rubber, isoprene rubber, ethylene propylene rubber, butyl rubber, styrene rubber, aliphatic polyester rubber, and chloroprene rubber.

(9) The degradable seal member for downhole tools according to any one of the above (1) to (8), wherein the degradable polymer material contains a polymer material containing a hydrolyzable functional group.

(10) The degradable seal member for downhole tools according to any one of the above (1) to (9), wherein the degradable polymer material contains a polymer material containing at least one urethane bond, ester bond, or amide bond.

(11) The degradable seal member for downhole tools according to any one of the above (1) to (10), wherein the degradable polymer material contains at least one selected from the group consisting of urethane rubber, polyester-based thermoplastic elastomer, and polyamide-based thermoplastic elastomer.

(12) The degradable seal member for downhole tools according to any one of the above (1) to (11), wherein the degradable polymer material contains from 0.1 to 20 parts by mass of a degradation accelerator relative to 100 parts by mass of the degradable polymer material.

(13) The degradable seal member for downhole tools according to the above (12), wherein the degradation accelerator is an acidic substance.

(14) The degradable seal member for downhole tools according to the above (13), wherein the acidic substance is an acid-producing substance.

(15) The degradable seal member for downhole tools according to the above (12), wherein the degradation accelerator is a plasticizer.

(16) The degradable seal member for downhole tools according to the above (12), wherein the degradation accelerator contains at least one selected from the group consisting of organic acids, inorganic acids, organic acid esters, inorganic acid esters, and acid anhydrides.

(17) The degradable seal member for downhole tools according to the above (12), wherein the degradation accelerator contains at least one selected from the group consisting of lauric acid, glycolic acid, lactic acid, phosphoric acid, glycolide, lactide, polyglycolic acid, polylactic acid, methyl p-toluene sulfonate, and 3,3',4,4'-benzophenone tetracarboxylic dianhydride.

(18) The degradable seal member for downhole tools according to any one of the above (1) to (17), wherein the degradable polymer material contains a reinforcing material.

Furthermore, another aspect of the present invention provides (21) a plug for well drilling comprising: a mandrel, and at least one degradable seal member for downhole tools described in any one of the above (1) to (20) disposed on an outer circumferential surface orthogonal to an axial direction of the mandrel.

Additionally, plugs for well drilling comprising the aforementioned degradable seal members for downhole tools described in (20) to (27) below are provided as specific aspects of the invention.

(20) The plug for well drilling according to the above (19), comprising: a diameter-expandable annular assisting member disposed on an outer circumferential surface orthogonal to an axial direction of the mandrel, the annular assisting member being capable of expanding in diameter to mitigate deformation incurred at the time of sealing action of at least one annular member that plugs a gap between an inner wall of a downhole and the diameter-expandable annular seal member.

(21) The plug for well drilling according to the above (19) or (20), comprising: at least one of at least one slip disposed on an outer circumferential surface orthogonal to the axial direction of the mandrel and a pair of rings between which at least one degradable seal member for downhole tools described in any one of the above (1) to (18) is provided.

(22) The plug for well drilling according to any one of the above (19) to (21), wherein the mandrel is formed from a degradable material.

(23) The plug for well drilling according to the above (22), wherein the degradable material contains an aliphatic polyester.

(24) The plug for well drilling according to the above (23), wherein the aliphatic polyester is polyglycolic acid.

(25) The plug for well drilling according to the above (24), wherein the polyglycolic acid has a weight average molecular weight of 180,000 to 300,000, and has a melt viscosity measured at a shear rate of 122 $sec^{-1}$ at temperature 270° C. of 700 to 2,000 Pa·s.

(26) The plug for well drilling according to any one of the above (19) to (25), wherein the degradable material contains a reinforcing material.

(27) The plug for well drilling according to any one of the above (19) to (26), wherein the mandrel is formed from a composite material containing a degradable material.

Yet further aspects of the present invention provide the methods for well drilling of the below (28) to (32) as specific aspects of the present invention.

(28) A method for well drilling, the method comprising: performing isolation treatment of a borehole using the degradable seal member for downhole tools described in any one of the above (1) to (18), preferably using a plug for well drilling comprising a mandrel and the degradable seal member for downhole tools, and then the degradable seal member for downhole tools, preferably all or a part of a plug for well drilling comprising the degradable seal member for downhole tools, being degraded.

(29) A method for well drilling, the method comprising: sealing a borehole using a downhole tool comprising the degradable seal member for downhole tools described in any one of the above (1) to (18), and then the degradable seal member for downhole tools being degraded inside the borehole.

(30) A method for well drilling, the method comprising: sealing a borehole using a downhole tool comprising the degradable seal member for downhole tools described in any one of the above (1) to (18) and further comprising another member for downhole tools containing a degradable material, and then the degradable seal member for downhole tools being degraded inside the borehole.

(31) The method for well drilling according to the above (30), wherein the degradable material contained in the other member for downhole tools is polyglycolic acid.

(32) A method for well drilling, the method comprising: sealing a borehole using a downhole tool comprising the degradable seal member for downhole tools described in any one of the above (1) to (18), the degradable sealing member for downhole tools abutting another member for downhole tools, and then the degradable seal member for downhole tools being degraded inside the borehole.

Advantageous Effects of Invention

According to a first aspect of the present invention, due to being a degradable seal member for downhole tools, the seal member being a diameter-expandable annular seal member, the diameter-expandable annular seal member comprising two or more annular members distributed along an axial direction, the annular members being formed from a degradable polymer material having hardness in a range from A60 to D80, the seal member exhibits the effect that, based on the fact that excavation conditions have become more harsh and diverse such as increased depth, it can perform sealing in downholes used in many applications, such as reliable sealing of boreholes to withstand the high fluid pressure of fracturing and the like, and it is easy to remove and makes it easy to secure a flow path, thereby reducing expense and shortening processes of well drilling.

According to another aspect of the present invention, a plug for well drilling comprising a mandrel and at least one of the above degradable seal members for downhole tools disposed on an outer circumferential surface orthogonal to an axial direction of the mandrel is provided. According to yet another aspect of the present invention, a method for well drilling, the method comprising performing isolation treatment of a borehole using the above degradable seal member for downhole tools, preferably using a plug for well drilling comprising a mandrel and the degradable seal member for downhole tools, and then the degradable seal member for downhole tools, preferably all or a part of the plug for well drilling comprising the degradable seal member for downhole tools, being degraded, is provided. These features exhibit the effect that it provides a method for well drilling by which borehole perforation and fracturing can be reliably performed, and that is easy to remove and makes it easy to secure a flow path, thereby reducing expense and shortening processes of well drilling.

DESCRIPTION OF EMBODIMENTS

Figure 1A:
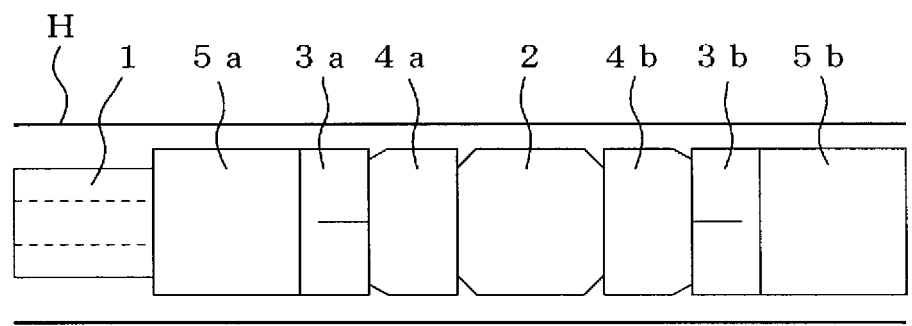
FIG. 1A is a schematic view illustrating a specific example of a plug for well drilling comprising a degradable seal member for downhole tools, which is a diameter-expandable annular seal member of the present invention.

The degradable seal member for downhole tools which is a diameter-expandable annular seal member of the present invention is an annular seal member that can be provided in or combined with another member as necessary in a downhole tool used in many other applications that require sealing, such as downhole tools used when performing treatments or operations in which high-pressure fluid is injected, such as fracturing.

The downhole tool that can comprise the diameter-expandable annular seal member (degradable seal member for downhole tools) of the present invention is not particularly limited, but in particular, it can be preferably applied in a plug for well drilling comprising a mandrel and the above degradable seal member for downhole tools disposed on the outer circumferential surface orthogonal to the axial direction of the mandrel.

The plug for well drilling comprising the degradable seal member for downhole tools of the present invention will be described below while citing specific examples in reference to FIGS. 1A and 1B.

I. Plug for Well Drilling

The plug for well drilling comprising the degradable seal member for downhole tools of the present invention (sometimes called "plug for well drilling of the present invention" hereinafter) is a plug for well drilling comprising a mandrel 1 and at least one degradable seal member for downhole tools 2, which is a diameter-expandable annular seal member and is disposed on the outer circumferential surface orthogonal to the axial direction of the mandrel (sometimes called "diameter-expandable annular seal member 2" or "degradable seal member for downhole tools 2" hereinafter). The diameter-expandable annular seal member 2 comprises two or more annular members distributed along an axial direction, and the annular members are formed from a degradable polymer material having hardness in a range from A60 to D80.

In the specific example of the plug for well drilling described below, the two or more annular members distributed along an axial direction provided in the diameter-expandable annular seal member comprises three annular members, namely a center annular member and two end annular members adjacent to the two ends of the mandrel along the axial direction thereof.

The degradable seal member for downhole tools which is a diameter-expandable annular seal member of the present invention and the plug for well drilling of the present invention are not limited to this specific example.

1. Mandrel

The plug for well drilling of the present invention comprises a mandrel 1.

The mandrel 1 provided in the plug for well drilling of the present invention is normally called a "core metal," and has a cross-section having a substantially circular shape and a length that is sufficiently long relative to the diameter of the cross-section and basically assures strength of the plug for well drilling of the present invention.

In the mandrel 1 provided in the plug for well drilling of the present invention, the diameter of the cross-section is selected as appropriate according to the size of borehole (by making it smaller than the inner diameter of the borehole, the mandrel can move inside the borehole, and as will be described later, the mandrel has a diameter of a degree that enables borehole plugging and fixing by diameter expansion of at least one diameter-expandable annular seal member 2 disposed on the outer circumferential surface of the mandrel 1 and by diameter expansion of a slip 3 provided as desired, and the like). The length of the mandrel 1 is, for example, approximately 5:1 to 20:1 the diameter of the cross-section, but is not limited thereto.

The diameter of the cross-section of the mandrel 1 is typically in the range of approximately 5 to 30 cm.

Hollow Part

From the perspectives of securing a flow path at the early stage of fracturing, reduction in the weight of the mandrel 1, and control of the degradation rate of the mandrel 1, the mandrel 1 provided in the plug for well drilling of the present invention is preferably a hollow mandrel in which the mandrel 1 has a hollow part along the axial direction in at least a portion thereof.

The hollow part may penetrate the mandrel 1 along the axial direction or does not necessarily penetrate the mandrel 1 along the axial direction.

In cases where the plug for well drilling is pressed into and moved inside the borehole using fluid, the mandrel 1 needs to have a hollow part along the axial direction.

When the mandrel 1 has a hollow part along the axial direction, the cross-sectional shape of the mandrel 1 is a circular shape formed by two concentric circles forming the diameter (outer diameter) of the mandrel 1 and the outer diameter of the hollow part (corresponding to the inside diameter of the mandrel 1).

The ratio of the diameters of the two concentric circles—that is, the ratio of the outer diameter of the hollow part to the diameter of the mandrel 1—is preferably not greater than 0.7.

The magnitude of this ratio has a reciprocal relationship with the magnitude of the ratio of the thickness of the hollow mandrel to the diameter of the mandrel 1, and therefore, determining the upper limit of this ratio can be considered equivalent to determining a preferable lower limit of the thickness of the hollow mandrel.

When the thickness of the hollow mandrel is too thin, the strength (in particular, the tensile strength) of the hollow mandrel may be insufficient when the plug for well drilling is disposed inside a borehole or at the time of borehole plugging or fracturing, and the plug for well drilling may be damaged in extreme cases.

Thus, the ratio of the outer diameter of the hollow part to the diameter of the mandrel 1 is more preferably not greater than 0.6 and even more preferably not greater than 0.5.

The diameter of the mandrel 1 and/or the outer diameter of the hollow part may be uniform along the axial direction of the mandrel 1, but may also vary along the axial direction.

That is, the mandrel 1 may have convex parts, stepped parts, concave parts (grooves), or the like on the outer circumferential surface of the mandrel 1 due to the fact that the diameter thereof varies along the axial direction.

In addition, convex parts, stepped parts, concave parts (grooves), or the like may be formed on the inner circumferential surface of the mandrel 1 due to the fact that the outer diameter of the hollow part varies along the axial direction.

The convex parts, stepped parts, or concave parts (grooves) on the outer circumferential surface and/or the inner circumferential surface of the mandrel may be used as sites for attaching or fixing other members to the outer circumferential surface and/or the inner circumferential surface of the mandrel 1, and in particular, as will be described later, these parts may serve as fixing parts for fixing a diameter-expandable annular seal member 2. Also, when the mandrel 1 has a hollow part, it may have a seat for holding a ball used to control the flow of fluid.

Degradable Material

The mandrel 1 provided in the plug for well drilling of the present invention is preferably formed from a degradable material.

The degradable material may be a degradable material that is, for example, biodegradable, meaning that it is degraded by microorganisms in the soil in which the fracturing fluid is used, or hydrolyzable, meaning that it is degraded by solvents in fracturing fluid, particularly by water, and also by acids or alkalis if desired. However, it may also be a degradable material that can be degraded chemically by some other method.

Preferably, it is a hydrolyzable material degraded by water of not less than a prescribed temperature.

Note that a material that physically loses shape such as by destruction or disintegration by the application of large mechanical force, as in metal materials such as aluminum widely used for mandrels provided in conventional plugs for well drilling, do not qualify as the degradable material that forms the mandrel 1 provided in the plug for well drilling of the present invention.

However, materials in which the intrinsic strength of resin decreases and the resin becomes weak due to a decrease in the degree of polymerization or the like, resulting in it simply disintegrating and losing its initial shape (also called "disintegrability" hereinafter) when a very small mechanical force is applied, as is seen in the degradable resin to be described later, also qualify as the above degradable material.

The degradable material that forms the mandrel 1 provided in the plug for well drilling of the present invention needs to have the strength expected for a material used in a high-temperature, high-pressure deep underground environment while also having excellent degradability. That material is not particularly limited, but a degradable resin is preferred.

A degradable resin means a resin that is biodegradable, hydrolyzable, or can be degraded chemically by another method, as described above.

Examples of the degradable resin include aliphatic polyesters such as polylactic acid, polyglycolic acid, and poly-ε-caprolactone, and polyvinyl alcohols (partially saponified polyvinyl alcohols and the like having a degree of saponification of 80 to 95 mol %) and the like, but it is more preferably an aliphatic polyester.

Specifically, the degradable material is preferably an aliphatic polyester.

The degradable resin may be one type alone or a combination obtained by blending two or more types.

[Aliphatic Polyester]

The aliphatic polyester is obtained by, for example, homopolymerization or copolymerization of an oxycarboxylic acid and/or a lactone, an esterification reaction of an aliphatic dicarboxylic acid and an aliphatic diol, or copolymerization of an aliphatic dicarboxylic acid, an aliphatic diol, and an oxycarboxylic acid and/or a lactone. It preferably dissolves quickly in water of a temperature from approximately 20 to 100° C.

Examples of oxycarboxylic acids include aliphatic hydroxycarboxylic acids having from 2 to 8 carbons, such as glycolic acid, lactic acid, malic acid, hydroxypropionic acid, hydroxybutyric acid, hydroxypentanoic acid, hydroxycaproic acid, hydroxyheptanoic acid, and hydroxyoctanoic acid, and the like.

Examples of lactones include lactones having from 3 to 10 carbons, such as propiolactone, butyrolactone, pivalolactone, and ε-caprolactone, and the like.

Examples of aliphatic dicarboxylic acids include aliphatic saturated dicarboxylic acids having from 2 to 8 carbons, such as oxalic acid, malonic acid, succinic acid, glutaric acid, and adipic acid, and aliphatic unsaturated dicarboxylic acids having from 4 to 8 carbons, such as maleic acid and fumaric acid, and the like.

Examples of aliphatic diols include alkylene glycols having from 2 to 6 carbons, such as ethylene glycol, propylene glycol, butanediol, and hexanediol, and polyalkylene glycols having from 2 to 4 carbons, such as polyethylene glycol, polypropylene glycol, and polybutylene glycol.

The components that form these polyesters may be each used alone or in combinations of two or more types.

Furthermore, components that form an aromatic polyester such as terephthalic acid may be used in combination provided that the properties as a degradable resin are not lost.

Particularly preferred examples of the aliphatic polyester include hydroxycarboxylic acid-based aliphatic polyesters such as polylactic acid (sometimes called "PLA" hereinafter) and polyglycolic acid (sometimes called "PGA" hereinafter); lactone-based aliphatic polyesters such as poly-ε-caprolactone; diol/dicarboxylic acid-based aliphatic polyesters such as polyethylene succinate and polybutylene succinate; copolymers thereof, e.g., glycolic acid/lactic acid copolymer (sometimes called "PGLA" hereinafter); mixtures thereof; and the like.

Additional examples include aliphatic polyesters that use a combination of aromatic components such as polyethylene adipate/terephthalate.

From the perspective of the strength and degradability required in the mandrel 1 provided in the plug for well drilling, the aliphatic polyester is most preferably at least one selected from the group consisting of PGA, PLA, and PGLA, and PGA is even more preferred.

The PGA encompasses not only homopolymers of glycolic acid, but also copolymers containing not less than 50 mass %, preferably not less than 75 mass %, more preferably not less than 85 mass %, even more preferably not less than 90 mass %, particularly preferably not less than 95 mass %, most preferably not less than 99 mass %, and above all, preferably not less than 99.5 mass %, of glycolic acid repeating units.

The PLA encompasses not only homopolymers of L-lactic acid or D-lactic acid, but also copolymers containing not less than 50 mass %, preferably not less than 75 mass %, more preferably not less than 85 mass %, and even more preferably not less than 90 mass % of L-lactic acid or D-lactic acid repeating units, as well as stereocomplex polylactic acid known to have high heat resistance, obtained by mixing poly-L-lactic acid and poly-D-lactic acid and thereby advantageously intertwining the molecular chains to form a stereocomplex.

As the PGLA, a copolymer in which the ratio (mass ratio) of glycolic acid repeating units to lactic acid repeating units is from 99:1 to 1:99, preferably from 90:10 to 10:90, and more preferably from 80:20 to 20:80, may be used.

Melt Viscosity

As the aliphatic polyester, preferably PGA, PLA, or PGLA, one having a melt viscosity of normally 50 to 5,000 Pa·s, preferably from 150 to 3,000 Pa·s, and more preferably from 300 to 1,500 Pa·s may be used.

The melt viscosity is that measured at temperature 270° C. and a shear rate of 122 $sec^{-1}$.

When melt viscosity is too low, the aliphatic polyester may not have the strength required in the mandrel 1 provided in the plug for well drilling.

When melt viscosity is too high, for example, a high melting temperature becomes necessary to manufacture the mandrel 1, and there is risk of the aliphatic polyester undergoing thermal degradation or degradability may be insufficient.

The melt viscosity is that measured using a capillograph (Capillograph 1-C manufactured by Toyo Seiki Seisaku-sho, Ltd.) on which a capillary (diameter 1 mm φ×length 10 mm) is mounted, measured at a shear rate of 122 $sec^{-1}$ after holding approximately 20 g of a sample at a prescribed temperature (270° C.) for 5 minutes.

From the perspective of moldability, such as no cracking occurring when molded by solidification- and extrusion-molding, the PGA, which is a particularly preferred aliphatic polyester, is more preferably one having a weight average molecular weight of 180,000 to 300,000 and a melt viscosity measured at temperature 270° C. and a shear rate of 122 $sec^{-1}$ of 700 to 2,000 Pa·s.

The PGA that is most preferred among these is one having a weight average molecular weight of 190,000 to 240,000 and a melt viscosity measured at temperature 270° C. and a shear rate of 122 $sec^{-1}$ of 800 to 1,200 Pa·s Melt viscosity is measured by the method described previously.

The weight average molecular weight is measured by gel permeation chromatography (GPC) under the following conditions using 10 μL of a sample solution obtained by dissolving a sample of 10 mg of PGA in hexafluoroisopropanol (HFIP) in which sodium trifluoroacetate was dissolved at a concentration of 5 mM, to make a total of 10 mL, and then filtering with a membrane filter.

GPC Measurement Conditions

Instrument: LC-9A, manufactured by Shimadzu Corporation

Columns: two HFIP-806M columns (connected in series)+one HFIP-LG precolumn manufactured by Showa Denko K.K.

Column Temperature: 40° C.

Eluent: HFIP solution in which sodium trifluoroacetate is dissolved at a concentration of 5 mM Flow rate: 1 mL/min Detector: differential refractometer Molecular weight calibration: Data of a molecular weight calibration curve produced by using five types of polymethylmethacrylates having standard molecular weights that are different from each other (manufactured by Polymer Laboratories Ltd.) is used Other Blended Components The degradable material, preferably degradable resin, more preferably aliphatic polyester, and even more preferably PGA, may also contain or be blended with various additives as other blended components, such as resin materials (other resins when the degradable material is a degradable resin), stabilizers, degradation accelerators or degradation inhibitors, and reinforcing materials, within a range that does not hinder the object of the present invention.

The degradable material preferably contains a reinforcing material, and in this case, the degradable material can be called a composite material.

When the degradable material is degradable resin, it is a so-called reinforced resin.

The mandrel 1 formed from reinforced resin is preferably formed from an aliphatic polyester containing a reinforcing material.

Note that, as will be described later, the degradable polymer material that forms the diameter-expandable annular seal member 2 may also contain reinforcing material, and therefore, it is preferred that the degradable polymer material and/or the degradable material contain a reinforcing material.

Reinforcing Material

As reinforcing materials, materials such as resin materials conventionally used as reinforcing materials with the objective of improving mechanical strength or heat resistance may be used, and fibrous reinforcing materials or granular or powdered reinforcing materials may be used.

The reinforcing materials may be contained typically in the amount of not greater than 150 parts by mass, and preferably in the range of 10 to 100 parts by mass, relative to 100 parts by mass of the degradable material such as degradable resin.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins; and the like.

Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder, milled fiber, zinc oxide, nickel carbonate, iron oxide, quartz powder, magnesium carbonate, barium sulfate, and the like may be used.

The particle size of the granular or powdered reinforcing material is normally from 0.01 to 1,000 µm, preferably from 0.05 to 500 µm, and more preferably from 0.1 to 200 µm.

These reinforcing materials may be each used alone or in combinations of two or more types.

The reinforcing material may be treated with a sizing agent or surface treatment agent as necessary.

Composite Material Containing Degradable Material

Additionally, the mandrel 1 formed from degradable material provided in the plug for well drilling of the present invention may be one in which a member of metal or inorganic matter has been incorporated in the degradable material, that is, the mandrel 1 may be formed from a composite material containing a degradable material constituted of a degradable material and a material such as metal or inorganic matter.

An example of the mandrel 1 formed from a composite material containing a degradable material includes a mandrel 1 formed from a composite material formed by providing a cavity of a prescribed shape in a parent material formed from a degradable material such as degradable resin, for example, PGA, inlaying metal (metal fragments or the like) or inorganic matter having a shape that conforms to the shape of the cavity, and fixing these with an adhesive or by winding wire, fibers, or the like such that the metal fragments or organic matter and the parent material can maintain a fixed state.

Tensile Strength

The mandrel 1 provided in the plug for well drilling of the present invention is preferably formed from a degradable material having a tensile strength at temperature 60° C. (sometimes called "60° C. tensile strength" hereinafter) of not less than 50 MPa.

Due to the mandrel 1 being formed from a degradable material having a 60° C. tensile strength of not less than 50 MPa, the plug for well drilling of the present invention can have sufficient strength to withstand the tensile stress applied to the mandrel 1 in environments at temperature 60° C. which is common in the shale gas layer, and also in environments at temperatures greater than 100° C., such as deep in the ground beyond 3,000 m underground.

The 60° C. tensile strength of the degradable material that forms the mandrel 1 is measured in accordance with JIS K7113, and measurement is performed while the test piece is stationary in an oven in order to achieve a test temperature of 60° C. (units: MPa).

The 60° C. tensile strength of the degradable material that forms the mandrel 1 is preferably not less than 75 MPa, and more preferably not less than 100 MPa.

In order to make the 60° C. tensile strength of the degradable material that forms the mandrel 1 not less than 50 MPa, methods by adjusting the type and characteristics (melt viscosity, molecular weight, and the like) of the degradable material, e.g., degradable resin, or the type, characteristics, and added amount of additives such as reinforcing materials may be used.

The upper limit of 60° C. tensile strength is not particularly limited but is normally 1,000 MPa, and often 750 MPa.

Fixing Part

The mandrel 1 may have convex parts, stepped parts, concave parts (grooves), or the like on the outer circumferential surface. These parts can be used as sites for attaching and fixing other members to the outer circumferential surface of the mandrel 1, and in particular, as fixing parts for fixing the diameter-expandable annular seal member 2.

As will be described in detail below, the plug for well drilling of the present invention comprises at least one diameter-expandable annular seal member 2 disposed on the outer circumferential surface orthogonal to the axial direction of the mandrel 1.

The diameter-expandable annular seal member 2 expands in diameter in the direction orthogonal to the axial direction of the mandrel 1 as it is compressed in that axial direction and the distance in the axial direction shrinks (in diameter), such that the inner wall H of the downhole and the outer circumferential surface of the mandrel 1 come into contact and plug (seal) the space between the plug and the downhole.

Next, since it is necessary for the seal between the plug and the borehole to be maintained while fracturing is performed, the diameter-expandable annular seal member 2, in many cases, needs to be held by some means in a diameter-expanded state—that is, in a compressed state in the axial direction of the mandrel 1.

Since the mandrel 1 may have convex parts, stepped parts, or concave parts (grooves) on the outer circumferential surface, the mandrel 1 provided in the plug for well drilling of the present invention preferably has a fixing part for fixing the diameter-expandable annular seal member 2 to the outer circumferential surface in the compressed state.

This fixing part may be a convex part, stepped part, or concave part (groove) as described above, or a screw part or other means capable of fixing the diameter-expandable annular seal member 2 to the outer circumferential surface of the mandrel 1 in the compressed state may be used.

From the perspective of ease of processing and molding, strength, and the like, the fixing part is more preferably at least one selected from the group consisting of a groove, stepped part, and a screw thread.

2. Diameter-Expandable Annular Seal Member

As described above, the degradable seal member for downhole tools which is a diameter-expandable annular seal member of the present invention is an annular seal member that can be provided in or combined with another member as necessary in a downhole tool used in many other applications that require sealing, such as downhole tools used when performing treatments or operations in which high-pressure fluid is injected, such as fracturing, wherein the downhole tool that may comprise the diameter-expandable annular seal member (degradable seal member for downhole tools) of the present invention is not particularly limited.

The diameter-expandable annular seal member 2 will be further described below while citing a plug for well drilling, which is a preferred application example of the downhole tool comprising the degradable seal member for downhole tools of the present invention.

The plug for well drilling comprising the degradable seal member for downhole tools of the present invention comprises at least one degradable seal member for downhole tools 2, which is a diameter-expandable annular seal member, disposed on the outer circumferential surface orthogonal to the axial direction of a mandrel 1.

Due to the diameter-expandable annular seal member 2 coming into contact directly or indirectly with, for example, a pair of rings 5a and 5b to be described later, the force in the axial direction of the mandrel 1 is transmitted on the outer circumferential surface of the mandrel 1. As a result, as illustrated in FIG. 1B, the seal member expands in diameter in a direction orthogonal to the axial direction of the mandrel 1 as it is compressed in the axial direction and the distance in the axial direction of the mandrel 1 decreases in diameter (shrinks).

The annular seal member 2 expands in diameter, and the outward part in the direction orthogonal to the axial direction comes into contact with the inner wall H of the borehole, and additionally, the inward part in the direction orthogonal to the axial direction comes into contact with the outer circumferential surface of the mandrel 1, thereby plugging (sealing) the space between the plug and the downhole.

The diameter-expandable annular seal member 2 can maintain a state of contact with the inner wall H of the borehole and the outer circumferential surface of the mandrel 1 while fracturing is subsequently performed, and has the function of maintaining the seal between the plug and the borehole.

Figure 1B:
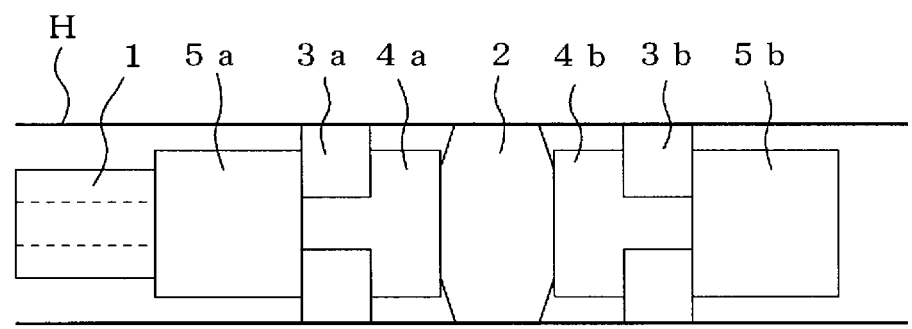
FIG. 1B is a schematic cross-sectional view illustrating a state in which the diameter-expandable annular seal member of the plug for well drilling of FIG. 1A has expanded.

When expanded, the diameter-expandable annular seal member 2 comes into contact with the inner wall H of the borehole and the outer circumferential surface of the mandrel 1 so as to plug (seal) the space between the plug and the borehole (FIG. 1B). Additionally, since it is required that a gap be present between the plug and the borehole (FIG. 1A) when the diameter-expandable annular seal member 2 is not expanded, the length of the diameter-expandable annular seal member 2 in the axial direction of the mandrel 1 is preferably from 10 to 90% and more preferably from 15 to 80% of the length of the mandrel 1 in the axial direction.

Due to the diameter-expandable annular seal member 2 having the length in the axial direction of the mandrel 1 described above, it provides a sufficient sealing function to the plug for well drilling comprising the diameter-expandable annular seal member 2, and can serve a function of assisting in fixing the borehole and the plug after sealing.

Two or More Annular Members Distributed Along Axial Direction

The degradable seal member for downhole tools 2 which is a diameter-expandable annular seal member of the present invention comprises two or more annular members distributed along an axial direction.

The arrangement of the two or more annular members provided in the diameter-expandable annular seal member of the present invention is not particularly limited. The two or more annular members distributed along an axial direction may be adjacent along the axial direction, or the two or more annular members distributed along an axial direction may be separated along the axial direction, or there may be three or more annular members distributed along the axial direction.

When the diameter-expandable annular seal member 2 comprises three or more annular members distributed along the axial direction, the three or more annular members may be arranged all adjacently, or some or all of the members may be arranged separately.

Additionally, each of the individual two or more annular members may be arranged directly adjacently to the mandrel 1 on the outer circumferential surface orthogonal to the axial direction of the mandrel 1, or they may be arranged so as to cover a step part or the like carved in the mandrel 1 or a separate member mounted on the mandrel 1, for example, the ring 5a or 5b or the like to be described later, or they may be arranged so as to be included in the separate member.

Center Annular Member and Two End Annular Members

One example in which the diameter-expandable annular seal member 2 of the present invention comprises three annular members distributed along the axial direction is a diameter-expandable annular seal member 2 comprising a center annular member arranged along the axial direction of the mandrel 1 and two end annular members adjacent to the two ends along the axial direction of the mandrel 1 of the center annular member.

Furthermore, each individual center annular member or two end annular member may be arranged directly adjacently to the mandrel 1 or may be arranged with a separate member interposed therebetween.

Hardness of Annular Member

For the two or more annular members distributed along an axial direction provided in the diameter-expandable annular seal member 2 of the present invention, the annular members are formed from a degradable polymer material having hardness in a range from A60 to D80.

In the present invention, the hardness of the degradable polymer material that forms the annular members means the hardness expressed as type A (sometimes called "hardness A" hereinafter) or type D (sometimes called "hardness D" hereinafter) of durometer hardness measured in accordance with ISO 7619.

Note that types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60).

Due to the annular members of the diameter-expandable annular seal member 2 of the present invention having hardness in the range given above, they can be configured so as to reliably seal a borehole to withstand the high fluid pressure of fracturing and the like by adjusting the structure and the like of the annular members.

The hardness of the annular members is preferably in a range from A65 to D78, and more preferably in a range from A70 to D75.

Degradable Polymer Material

The two or more annular members distributed along an axial direction provided in the diameter-expandable annular seal member 2 of the present invention are formed from a degradable polymer material.

Similar to what was described above for the mandrel 1, degradability may indicate, for example, biodegradability, meaning that it is degraded by microorganisms in the soil in which the fracturing fluid is used, or hydrolyzability, meaning that it is degraded by a solvent in the fracturing fluid, particularly water, and also by acids or alkalis if desired, or degradability, meaning that it can be degraded chemically by some other method, but it preferably indicates hydrolyzability, meaning that it is degraded by water of not less than a prescribed temperature.

Furthermore, disintegrability, whereby a polymer material becomes weak due to the intrinsic strength of the polymer material decreasing due to a decrease in the degree of polymerization or the like, resulting in it simply disintegrating and losing its initial shape when a very small mechanical force is applied, also qualifies as degradability.

Examples of the degradable polymer material include the degradable resins described above in regard to the mandrel 1, and also include conventionally known degradable rubber materials.

As a degradable rubber material, the degradable polymer material preferably contains at least one rubber material selected from the group consisting of urethane rubber, acrylic rubber, polyester-based thermoplastic elastomer, polyamide-based thermoplastic elastomer, natural rubber, isoprene rubber, ethylene propylene rubber, butyl rubber, styrene rubber, aliphatic polyester rubber, and chloroprene rubber.

Furthermore, because hydrolyzability is sometimes desired, meaning it is degraded by water of not less than a prescribed temperature, the degradable polymer material may also include a polymer material containing a hydrolyzable functional group (for example, a urethane group, ester group, amide group, carboxyl group, hydroxyl group, silyl group, acid anhydride, acid halide, or the like), and also, the degradable polymer material may include a polymer material containing at least one urethane bond, ester bond, or amide bond in the main chain of the molecule.

Above all, the degradable polymer material preferably contains a urethane rubber, a polyester-based thermoplastic elastomer, or a polyamide-based thermoplastic elastomer.

The degradable polymer materials, preferably the degradable rubber materials, that form each of the two or more annular members distributed along an axial direction may be the same or different, and may be each used alone or in combination by blending two or more types. By also adjusting the structure of each of the annular members, they can be configured so as to reliably seal a borehole to withstand high fluid pressure such as fracturing.

A particularly preferable degradable polymer material, preferably degradable rubber material, is a urethane rubber because it is possible to easily control the degradability or disintegrability thereof by adjusting the structure, hardness, degree of crosslinking, and the like of the rubber material and by selecting other blended agents.

That is, a particularly preferred degradable rubber material is a degradable rubber material containing urethane rubber.

Note that nitrile rubbers or hydrogenated nitrile rubbers, which are rubber materials that are conventionally used widely for downhole tools due to their excellent oil resistance, heat resistance, water resistance, and the like, are not normally employed as degradable rubber materials that form the at least one diameter-expandable annular seal member 2 provided in the plug for well drilling of the present invention.

66° C. Tensile Fracture Strain

The annular members provided in the degradable seal member for downhole tools which is a diameter-expandable annular seal member 2 of the present invention are preferred because the strength of the degradable seal member for downhole tools is maintained and it can reliably continue to plug the downhole for the duration required to perform well treatment such as fracturing, because the tensile fracture strain at 66° C. (sometimes called "66° C. tensile fracture strain" hereinafter) is not less than 50%.

Specifically, when a borehole is plugged (sealed) using the degradable seal member for downhole tools, there is no risk of the degradable seal member for downhole tools breaking even if it is deformed so as to reliably engage with the shape of the downhole tool and the shape of the downhole (shape of the casing), and specifically, even if it is deformed while incurring large tensile force (and compressive force). Thus, the contact area of the degradable seal member for downhole tools and the casing is large, resulting in reliable plugging.

Additionally, it has the effect that the sealing of the fluid is difficult to break even if it incurs large tensile force (and compressive force) due to extremely high pressure being applied by fluid for implementing a treatment that requires sealing such as fracturing.

The 66° C. tensile fracture strain is that measured at tensile fracture at 66° C. in accordance with ISO 37 (JIS K6251).

The 66° C. tensile fracture strain is preferably not less than 80%, and more preferably not less than 100%.

The 66° C. tensile fracture strain does not have a particular upper limit, but it is normally not greater than 500% and often not greater than 480% because if the 66° C. tensile fracture strain is too high, the degradable seal member for downhole tools may not easily break into small fragments when it is degraded and loses strength after the required well treatments.

66° C. Compressive Stress

The annular members provided in the degradable seal member for downhole tools which is a diameter-expandable annular seal member 2 of the present invention are preferred because the strength of the degradable seal member for downhole tools is maintained and it can more reliably continue to plug the downhole for the duration required to perform well treatment such as fracturing, because, as desired, the 70% strain compressive stress at 66° C. (sometimes called "66° C. compressive stress" hereinafter) is not less than 10 MPa.

Specifically, when a borehole is plugged (sealed) using the degradable seal member for downhole tools, there is no risk of the degradable seal member for downhole tools breaking even if it is deformed so as to reliably engage with the shape of the downhole tool and the shape of the downhole (shape of the casing), and specifically, even if it is deformed while incurring large compressive force (and tension). Thus, the contact area of the degradable seal member for downhole tools and the casing is large, resulting in reliable plugging.

Additionally, it has the effect that the sealing of fluid is difficult to break even if it incurs large compressive force (and tensile force) due to extremely high pressure being applied by fluid for implementing a treatment that requires sealing such as fracturing.

The 66° C. compressive stress represents the compressive stress (units: MPa) at compressive strain of 70% or the maximum stress value until fracture when it fractures before reaching compressive strain of 70%, measured at 66° C. in accordance with ISO 14126 (JIS K7018).

The 66° C. compressive stress is preferably not less than 20 MPa, and even more preferably not less than 30 MPa.

The upper limit of the 66° C. compressive stress is not particularly limited, but is normally not greater than 200 MPa, and often not greater than 150 MPa.

66° C. Compressive Fracture Strain

The annular members provided in the degradable seal member for downhole tools which is a diameter-expandable annular seal member 2 of the present invention are preferred because the strength of the degradable seal member for downhole tools is maintained and it can reliably continue to plug a downhole for the duration required to perform well treatment such as fracturing, because, as desired, the compressive fracture strain at temperature 66° C. (sometimes called "66° C. compressive fracture strain" hereinafter) is not less than 50%.

The 66° C. compressive fracture strain is the strain (units: %) measured at compressive fracture at 66° C. in accordance with ISO 14126 (JIS K7018).

The 66° C. compressive fracture strain is preferably not less than 60%, and more preferably not less than 70%.

The upper limit of the 66° C. compressive fracture strain is 100%, but is normally not greater than 99%.

66° C. Compressive Stress Ratio

The annular members provided in the degradable seal member for downhole tools which is a diameter-expandable annular seal member 2 of the present invention are preferred because the strength of the degradable seal member for downhole tools is maintained and it can reliably continue to plug the downhole for the duration required to perform well treatment such as fracturing, because, as desired, the ratio of compressive stress at 70% compressive strain relative to compressive stress at 5% compressive strain at 66° C. (sometimes called "66° C. compressive stress ratio" hereinafter) is not less than 5:1.

Specifically, when a borehole is plugged (sealed) using the degradable seal member for downhole tools, the member is capable of deforming so as to reliably engage with the shape of the downhole tool and the shape of the downhole (shape of the casing) because the initial compressive strain of the degradable seal member for downhole tools is small (it deforms easily), and additionally, when it is deformed while incurring large compressive force (and tensile force), due to the stress of the seal member rising greatly in regions where the amount of deformation is large, it results in a state where, for example, the seal member of the contact portion of the seal member with the casing has a high compressive stress (and tensile force), and as a result, even when high pressure is applied, for example when a well treatment requiring sealing such as fracturing is performed, it has sufficient seal performance and plugging is reliable.

The 66° C. compressive stress ratio is that measured at 66° C. in accordance with ISO 14126 (JIS K7018).

The 66° C. compressive stress ratio is more preferably not less than 8:1, and even more preferably not less than 10:1.

The upper limit of the 66° C. compressive stress ratio is not particularly limited, but is normally not greater than 200:1, and often not greater than 150:1.

Furthermore, in many cases, when the degradable seal member for downhole tools of the present invention having a 66° C. compressive stress ratio of not less than 5:1 of each of the annular members also has a ratio of compressive stress at 70% compressive strain relative to compressive stress at 5% compressive strain of not less than 5:1 at other temperatures, for example, the range from room temperature to 149° C., it is more desirable because it can fulfill the seal function and the like in a wide temperature range.

However, even if the above compressive stress ratio of a degradable seal member for downhole tools is less than 5:1 in a part of the above temperature range, for example, at temperature 149° C., that degradable seal member for downhole tools is practical as long as the 66° C. compressive stress ratio is not less than 5:1.

150° C. Compressive Stress 5% Decrease Time, and Difference in 150° C. Compressive Stress 5% Decrease Time In each of the polymer materials (which are degradable polymer materials) that form the two or more annular members provided in the diameter-expandable annular seal member 2 of the present invention, the difference in time taken for a decrease in 50% strain compressive stress of 50% strain compressive stress after immersion in 150° C. water relative to 50% strain compressive stress before immersion to be not less than 5% (sometimes called "150° C. compressive stress 5% decrease time" hereinafter) is preferably within 2 days.

Specifically, the diameter-expandable annular seal member 2 of the present invention seals (isolation treatment) the required locations of a downhole (borehole) to block fluid, and then a series of operations that use high-pressure fluid such as fracturing are completed, and when production of petroleum, gas, or the like is started, it is desirable that the diameter-expandable annular seal member 2 that seals the borehole quickly degrades and is removed.

Due to the fact that the difference in 150° C. compressive stress 5% decrease time in the polymer materials that form the two or more annular members is within 2 days, productivity improves because the two or more annular members degrade in a short time with good balance, the sealing of the borehole is sufficiently released in a short time. Furthermore, there is no hindrance to the flow of the hydrocarbon resources such as petroleum and gas.

Accordingly, the difference in 150° C. compressive stress 5% decrease time is more preferably within 1.5 days, even more preferably within 1 day, particularly preferably within 12 hours, and most preferably within 6 hours.

There is no particular lower limit of the difference in 150° C. compressive stress 5% decrease time, i.e., it is 0 days (hours). That is, it is desirable that there is substantially no difference in 150° C. compressive stress 5% decrease time.

The method for measuring 150° C. compressive stress 5% decrease time is as follows.

Specifically, the required number of samples of polymer material cut into a thickness, length, and width of 5 mm each from two or more annular members provided in the diameter-expandable annular seal member 2 are each immersed in 400 mL of water (deionized water) of temperature 150° C., and each time a prescribed duration elapses (for example, every 6 hours, or, when progression of the change in sample shape is rapid, every 1 hour, or the like), the sample is removed from the water, compressive stress is measured at room temperature according to JIS K7181 (conforming to ISO 604), the compressive stress at 50% compressive strain is determined, and this is taken as the 50% strain compressive stress of each elapsed duration of each sample.

The value of 50% strain compressive stress at each elapsed duration of each of the samples is compared with the value of 50% strain compressive stress of each of the samples measured in advance before immersion in 150° C. water (deionized water) (sometimes called "initial 50% strain compressive stress" hereinafter), and the decrease of the initial 50% strain compressive stress (sometimes called "150° C. compressive stress decrease" hereinafter; units: %) is calculated, and the elapsed duration of immersion in 150° C. water until the 150° C. compressive stress decrease reaches 5% is determined.

Normally, the 150° C. compressive stress 5% decrease time can be determined by calculation from the change in 150° C. compressive stress decrease obtained based on the value of 50% strain compressive stress at each elapsed duration measured each time the prescribed duration elapses.

Next, the 150° C. compressive stress 5% decrease time is compared for the two or more annular members, to determine the difference in 150° C. compressive stress 5% decrease time.

With the diameter-expandable annular seal member 2 of the present invention, due to the fact that the difference in 150° C. compressive stress 5% decrease time in the polymer materials that form the two or more annular members is within 2 days, it can be expected that productivity will improve because the two or more annular members degrade in a short time with good balance, the sealing of the borehole is sufficiently released in a short time, and furthermore, there is no hindrance to the flow of the hydrocarbon resources such as petroleum and gas in various downhole temperature environments such as 177° C. (350° F.), 163° C. (325° F.), 149° C. (300° F.), 121° C. (250° F.), 93° C. (200° F.), 80° C., or 66° C., as well as 25 to 40° C.

Thus, by combining materials of which the difference in 150° C. compressive stress 5% decrease time is within 2 days according to the downhole environment and processes, it is possible to select the optimal annular members for the diameter-expandable annular seal member 2 of the present invention.

150° C. 24-Hour Compressive Stress Decrease

Because the difference in 150° C. compressive stress 5% decrease time is a characteristic related to the degree of degradability in 150° C. water, it is desirable that in the diameter-expandable annular seal member 2 of the present invention, the polymer materials that form the annular members have a decrease of 50% strain compressive stress after immersion for 24 hours in 150° C. water relative to 50% strain compressive stress before immersion (sometimes called "150° C. 24-hour compressive stress decrease" hereinafter) of not less than 5%.

Needless to say, when the 150° C. 24-hour compressive stress decrease of the polymer materials that form the annular members is not less than 5%, the difference in 150° C. compressive stress 5% decrease time is within 2 days.

The method for measuring the 150° C. 24-hour compressive stress decrease is as follows.

Specifically, in the same manner as the method for measuring the difference in 150° C. compressive stress 5% decrease time, samples of the polymer materials that form the annular members are immersed in 150° C. water, and after 24 hours elapse, the samples are removed from the water and the 50% strain compressive stress is measured, and the 150° C. 24-hour compressive stress decrease is calculated from that value and the initial value of 50% strain compressive stress.

Due to the fact that the 150° C. 24-hour compressive stress decrease of the polymer materials that form the annular members of the diameter-expandable annular seal member 2 of the present invention is preferably not less than 5%, the diameter-expandable annular seal member 2 loses its plugging function within several hours to several weeks in a downhole environment due to degrading or disintegrating and disappearing, disintegrating due to losing strength, and losing its ability to withstand the various forces applied to the seal member.

Thus, it can contribute to reducing the expense or shortening the processes of hydrocarbon resource recovery without requiring the substantial cost and time for retrieving or physically destroying the diameter-expandable annular seal member 2 for the purpose of releasing the plugging of the space between the plug and the borehole.

The diameter-expandable annular seal member 2 of the present invention and the plug for well drilling comprising at least one of that diameter-expandable annular seal member 2 require a diversity of performance retention time and degradation time, such as diverse strength, according to the environment such as downhole temperature and according to the processes carried out in that environment. Due to the fact that the diameter-expandable annular seal member 2 of the present invention is formed from a degradable polymer material, preferably a degradable rubber material, having a 150° C. 24-hour compressive stress decrease of not less than 5%, it has the characteristic of maintaining strength for a certain time and then degrading in various downhole temperature environments, such as 177° C., 163° C., 149° C., 121° C., 93° C., 80° C., or 66° C., as well as 25 to 40° C.

The degradable polymer material having a 150° C. 24-hour compressive stress decrease of not less than 5% that is preferably used as the degradable polymer material, preferably degradable rubber material, that forms the two or more annular members of the diameter-expandable annular seal member 2 of the present invention preferably has a 150° C. 24-hour compressive stress decrease of not less than 10%, and more preferably not less than 20%, from the perspective that degradability (or disintegrability) is excellent (enabling it to be designed to degrade in a desired short time).

Although it also depends on the magnitude of the initial 50% strain compressive stress of the degradable polymer material to be described later, the 150° C. 24-hour compressive stress decrease is more preferably not less than 50%, particularly preferably not less than 70%, even more preferably not less than 80%, and most preferably not less than 90%.

The upper limit of 150° C. 24-hour compressive stress decrease of the polymer materials that form the two or more annular members of the diameter-expandable annular seal member 2 is 100% (meaning that the 50% strain compressive stress is completely lost after immersion for 24 hours in 150° C. water, and specifically, meaning that the degradable polymer materials in samples cut out from the two or more annular members degrades and elutes out or loses its shape or disappears as a result of degradation or elution while immersed in 150° C. water, or the samples disintegrate before reaching 50% strain when compressive stress is measured).

Note that the 150° C. 24-hour compressive stress decrease is often 100% in degradable polymer materials other than degradable rubber materials.

Initial 50% Strain Compressive Stress

The initial 50% strain compressive stress of the polymer materials that form the two or more annular members provided in the diameter-expandable annular seal member 2 of the present invention is not particularly limited as long as the strength of the diameter-expandable annular seal member 2 is maintained and it can reliably continue to plug the downhole for the duration required to perform perforation or fracturing in a deep underground downhole (the required duration including transport or moving the plug to the prescribed location, plugging the downhole with the plug for well drilling, and preparation for and implementation of perforation or fracturing; often about 1 to 2 days, but sometimes shorter, such as 30 minutes to several hours). However, it is normally not less than 1 MPa, and often not less than 3 MPa, and particularly preferably not less than 5 MPa.

Similarly, there is no particular upper limit of the initial 50% strain compressive stress of the polymer materials that form the annular members, but from the perspectives of ease of handling and degradability (or disintegrability), it is normally not greater than 200 MPa, and often not greater than 150 MPa.

Control of Degradation Time, Degradation Speed

In the diameter-expandable annular seal member 2 of the present invention, the degradation time, degradation speed, and the like at which a decrease in 50% strain compressive stress of the polymer materials that form the annular members occurs can be controlled.

The control factors and the degree to which they can control them differ depending on the type of polymer material, but, for example, in the case of rubber materials, it is possible to control the degradation speed by the following means: adjusting the degree of vulcanization, i.e., adjusting the extent of crosslinking between molecular chains; changing the vulcanization method and changing the type and ratio of the crosslinking agent; changing the degree of hardness (in general, degradation is suppressed when hardness is increased, and degradation is accelerated when hardness is decreased); adjusting the type and quantity of fillers and blending agents such as hydrolysis inhibitors; changing molding conditions and effect conditions. Furthermore, the degradation speed can be adjusted by accelerating breaking of molecular chains by adding an acid or plasticizer or the like.

Furthermore, in a degradable resin that is hydrolyzable or biodegradable, it can be adjusted by a plurality of techniques, such as adjusting the degree of copolymerization and adding a degradation accelerator.

In the above diameter-expandable annular seal member 2, due to the fact that the polymer materials that form the annular members have a difference in 150° C. compressive stress 5% decrease time of within 2 days, and, as desired, have a 150° C. 24-hour compressive stress decrease of not less than 5%, the diameter-expandable annular seal member 2 may be, for example, biodegradable, meaning that it is degraded by microorganisms in the soil in which the fracturing fluid and the like are used, or hydrolyzable, meaning that it is degraded by a solvent such as fracturing fluid, particularly by water, and also by acids or alkalis if desired, and additionally, degradable, meaning that it can be degraded chemically by some other method, and in particular, it may be hydrolyzable, meaning that it is degraded by water of at least a prescribed temperature.

Furthermore, as described above, the diameter-expandable annular seal member 2 may also be one in which the intrinsic strength of the polymer material decreases and the rubber material becomes weak due to a decrease in the degree of polymerization or the like, resulting in it easily disintegrating and losing its shape (disintegrability) when a very small mechanical force is applied.

150° C. 72-Hour Mass Loss Rate

From the perspective of reliably exhibiting degradability in a downhole environment, the polymer materials that form the annular members provided in the degradable seal member for downhole tools which is a diameter-expandable annular seal member 2 of the present invention preferably also have a mass loss rate after immersion for 72 hours in 150° C. water relative to mass before immersion (sometimes called "150° C. 72-hour mass loss rate" hereinafter) of 5 to 100%.

The 150° C. 72-hour mass loss rate of a degradable seal member for downhole tools is determined as follows. Specifically, a sample of each polymer material cut out to a size of 20 mm each in thickness, length, and width is immersed in 400 mL of 150° C. water (deionized water or the like) and then removed after 72 hours, and by comparing the mass of the sample measured after immersion to the mass of the sample measured in advance before immersion in 150° C. water (sometimes called "initial mass" hereinafter), the loss rate of mass relative to the initial mass (unit: %) is calculated.

Note that when the sample of the annular member degrades and elutes out or loses its shape or disappears while immersed in 150° C. water, the mass loss rate is taken as 100%.

Due to the fact that the polymer materials that form the annular members have a 150° C. 72-hour mass loss rate of 5 to 100%, the degradable seal member for downhole tools formed from a rubber material containing a prescribed amount of degradation accelerator degrades or disintegrates within a prescribed period within several hours to several weeks in a downhole environment, and thus, because the sealing function is lost due to the degradable seal member for downhole tools degrading or disintegrating, it can contribute to reduced expense or shortening of processes for well drilling.

A degradable seal member for downhole tools requires a diversity of functional retention time and functional loss time of the sealing function according to various environments such as downhole temperatures and according to the processes carried out in those environments. Due to the fact that the polymer materials that form the annular members have a 150° C. 72-hour compressive stress decrease of preferably from 50 to 100%, more preferably from 70 to 100%, particularly preferably from 80 to 100%, and most preferably from 90 to 100%, the degradable seal member for downhole tools of the present invention can have the characteristic of exhibiting a sealing function for a certain time and then losing the sealing function and releasing the seal in various downhole temperature environments, for example, 177° C., 163° C., 149° C., 121° C., 93° C., 80° C., or 66° C., as well as 25 to 40° C.

The factors that control the 150° C. 72-hour mass loss rate of the degradable seal member for downhole tools and the degree to which they can control it are the same as those described above for 50% strain compressive stress.

23° C. Compressive Stress Decrease

The polymer material that forms the annular members provided in the degradable seal member for downhole tools which is a diameter-expandable annular seal member 2 of the present invention is preferred because the strength of the degradable seal member for downhole tools is maintained and it can more reliably continue to plug the downhole for the duration required to perform well treatment such as fracturing, due to the facts that, as also desired, it is stable in a dry environment and the decrease of the 50% strain compressive stress after immersion for 6 hours in 23° C. water relative to the 50% strain compressive stress after immersion for 1 hour (sometimes called "23° C. compressive stress decrease" hereinafter) is less than 5%.

Specifically, plugging of the downhole is no longer lost in an unexpectedly short time based on the fact that excavation conditions for well drilling have become diverse.

In particular, due to the fact that the degradable seal member for downhole tools is stable in a dry environment, the seal function is not lost at the stage where the downhole tool comprising the degradable seal member for downhole tools of the present invention is disposed in the borehole and before well treatment such as fracturing has been performed.

The method for measuring the 23° C. compressive stress decrease of the degradable seal member for downhole tools is the same as the method for measuring the 150° C. compressive stress decrease described above, but instead of being immersed in 150° C. water, it is immersed for the required time in 23° C. water.

The 23° C. compressive stress decrease is more preferably less than 4%, and even more preferably less than 3%.

The lower limit of the 23° C. compressive stress decrease is 0%, but there is no impediment to use if it is approximately 0.5%.

Note that for the degradable seal member for downhole tools of the present invention, "stable in a dry environment" means that the compressive stress does not decrease for at least 168 hours (7 days) in an environment at temperature 23° C. and relative humidity 50%.

Particularly Preferred Degradable Polymer Material

From the above perspectives, due to the expectation that they will readily disintegrate after a prescribed time by fluid such as fracturing fluid, particularly preferred materials used as the degradable polymer material suited for forming the annular members provided in the diameter-expandable annular seal member 2 of the present invention include degradable rubbers such as urethane rubber, acrylic rubber, polyester-based thermoplastic elastomer, and polyamide-based thermoplastic elastomer, and hydrolyzable or biodegradable resins, specifically, for example, polymer materials having a hydrolyzable functional group. These may be each used alone or as mixtures with other polymer materials (resin materials, rubber materials, and the like).

The hardness of the degradable polymer materials that form the two or more annular members distributed along the axial direction may be the same or different.

Urethane Rubber

The urethane rubber (sometimes also called "urethane elastomer") that is a degradable rubber material that is particularly preferably used as the degradable polymer material that forms the diameter-expandable annular seal member 2 of the present invention is a rubber material having a urethane bond in the molecule, and is normally obtained by condensation with an isocyanate compound and a compound having a hydroxyl group.

As the isocyanate compound, aromatic (optionally having a plurality of aromatic rings), aliphatic, or alicyclic di-, tri-, or tetra-polyisocyanates or mixtures thereof are used.

The compound having a hydroxyl group is broadly classified into polyester-type urethane rubbers having an ester-bond in the main chain thereof (also called "ester-based urethane rubbers" hereinafter) and polyether-based urethane rubbers having an ether-bond in the main chain thereof (also called "ether-type urethane rubbers" hereinafter), and ester-based urethane rubbers are preferred in many cases because their degradability and disintegrability are easier to control.

Urethane rubber is an elastic body having both the elasticity (flexibility) of synthetic rubber and the rigidity (solidity) of plastic. It is generally known to have excellent abrasion resistance, chemical resistance, and oil resistance, high mechanical strength, high load tolerance, and high elasticity with high energy absorbency.

Depending on the molding method, urethane rubber can be classified into i) kneaded (millable) type, which can be molded by the same processing method as general rubber; ii) thermoplastic type, which can be molded by the same processing methods as thermoplastic resin, and iii) poured type, which can be molded by thermosetting process methods using liquid starting materials. Any type may be used as the urethane rubber that forms the diameter-expandable annular seal member 2 of the present invention.

Specific Examples of Urethane Rubber

Particularly preferred specific examples of the urethane rubber include ester-type thermoplastic urethane rubber (uncrosslinked type) having a durometer hardness (in conformance with ISO 7619) of A80, ester-type thermoplastic urethane rubber (crosslinked type) having a hardness of A80, ester-type thermoplastic urethane rubber (uncrosslinked type) having a hardness of A85, ester-type thermoplastic urethane rubber (crosslinked type) having a hardness of A85, ester-type thermoplastic urethane rubber (uncrosslinked type) having a hardness of A90, ester-type thermoplastic urethane rubber (crosslinked type) having a hardness of A90, ester-type thermoplastic urethane rubber (uncrosslinked type) having a hardness of A95, ester-type thermoplastic urethane rubber (crosslinked type) having a hardness of A95, ester-type thermoplastic urethane rubber (crosslinked type) having a hardness of D74, ester-type thermoplastic urethane rubber (uncrosslinked type) having a hardness of D74, and the like.

Additional examples include ester-type thermosetting urethane rubber (Stabaxol (registered trademark) added as a hydrolysis inhibitor) having a hardness of A70, ester-type thermosetting urethane rubber (no hydrolysis inhibitor added) having a hardness of A82, ester-type thermosetting urethane rubber (Stabaxol (registered trademark) added as a hydrolysis inhibitor) having a hardness of A82, ester-type thermosetting urethane rubber (Stabaxol (registered trademark) added as a hydrolysis inhibitor) having a hardness of A90, ester-type thermosetting urethane rubber (no hydrolysis inhibitor added) having a hardness of A90, and the like.

Acrylic Rubber

The acrylic rubber that is preferably used as the degradable polymer material that forms the diameter-expandable annular seal member 2 of the present invention is generically called a rubber-like polymer containing an acrylic acid ester as the main component. These include ACM, which is a copolymer of an acrylic acid ester and chloroethyl vinyl ether, AEM, which is a copolymer of an acrylic acid ester and ethylene, ANM, which is a copolymer of an acrylic acid ester and acrylonitrile, and the like.

Because acrylic rubber does not contain an unsaturated bond in the main chain, it has high chemical stability and has characteristics such as heat resistance, oil resistance, aging resistance, and the like.

On the other hand, acrylic rubber is suitable as the degradable polymer material that forms the diameter-expandable annular seal member 2 of the present invention because it disintegrates over time because it has inferior water resistance and water vapor resistance.

Polyester-Based Thermoplastic Elastomer

The polyester-based thermoplastic elastomer that is preferably used as the degradable polymer material that forms the diameter-expandable annular seal member 2 of the present invention is an elastomer containing a polyester-based block copolymer as the main component.

Specific examples include block copolymers of a hard segment composed of polyester and a soft segment composed of polyether. Examples of the hard segment include aromatic polyesters and aliphatic polyesters, more specifically polyethylene terephthalate, polybutylene terephthalate, polyethylene naphthalate, polybutylene naphthalate, polyhydroxyalkanoic acid, and the like. Examples of the soft segment include polyethers such as polyethylene glycol, polypropylene glycol, polytetramethylene ether glycol, and the like.

Other examples are block copolymers in which the hard segment and the soft segment are composed of polyesters. Examples of the hard segment include aromatic polyesters, more specifically polyethylene terephthalate, polybutylene terephthalate, polyethylene naphthalate, polybutylene naphthalate, and the like. Examples of the soft segment include aliphatic polyesters having lower elasticity than the hard segment, such as polyhydroxyalkanoic acids having an alkyl chain length of 2 or more.

The types and the ratio of these hard segments and soft segments may be adjusted so as to conform to the desired physical properties of the elastomer, particularly the desired degradation characteristics and mechanical characteristics. Additionally, a polyester-based thermoplastic elastomer having the desired physical properties may be obtained by further combining various compounding agents as necessary.

The polyester-based thermoplastic elastomer has the characteristics of both plastic and rubber, and can be molded by various mold processing techniques such as injection molding, extrusion molding, blow molding, or the like. Additionally, due to having an ester bond, it has the characteristic of readily disintegrating in a prescribed time.

To cite commercially available products, Pelprene (registered trademark) P types P30B (hardness A71), P40B (hardness A82), P40H (hardness A89), and P55B (hardness A94) manufactured by Toyobo Co., Ltd., and Hytrel (registered trademark) 3046 (hardness A77), G3548L (hardness A80), and 4047N (hardness A90) manufactured by DuPont-Toray Co., Ltd., and the like are materials with relatively high hardness for rubber. Their hardness is suited to the high-temperature, high-pressure conditions assumed in a downhole tool environment, and they are degradable seal members suitable for a seal member for downhole tools.

Additionally, Pelprene (registered trademark) S types S1001 (hardness A96) and S9001 (hardness A99) and Hytrel (registered trademark) 6377 (hardness D63) and 7277 (hardness D72) and the like have hardness suited to seal applications and the like as a thin rubber member, and they are rubber materials suitable for a degradable seal member for downhole tools.

These polyester-based thermoplastic elastomers may be each used alone but may also be used as a mixture with other thermoplastic elastomers and/or resin materials.

Polyamide-Based Thermoplastic Elastomer

The polyamide-based thermoplastic elastomer that is preferably used as a degradable polymer material that forms the diameter-expandable annular seal member 2 of the present invention is a block copolymer of a hard segment composed of a polyamide and a soft segment composed of a polyether and/or polyester.

Examples of the hard segment include aliphatic polyamides, more specifically Nylon 6, Nylon 11, and Nylon 12, and examples of the soft segment include polyethers such as polyethylene glycol, polypropylene glycol, polytetramethylene ether glycol, and the like.

The types and the ratio of these hard segments to soft segments may be adjusted so as to conform to the desired physical properties of the elastomer, particularly the desired degradation characteristics and mechanical characteristics. Additionally, a polyamide-based thermoplastic elastomer having the desired physical properties may be obtained by further combining various compounding agents as necessary.

The polyamide-based thermoplastic elastomer has intermediate properties between rubber and plastic, and can be molded by various mold processing techniques such as injection molding, extrusion molding, and blow molding. Additionally, due to having an amide bond, it has the characteristic of hydrolyzing and readily disintegrating at high temperature and high pressure.

Examples of commercially available products include TPAE-12 (hardness D12 according to JIS K7115), TPAE-38 (hardness D32), TPAE-10 (hardness D41), TPAE-23 (hardness D62), and PA-260 (hardness D69) manufactured by T&K TOKA Corp., and the like. Since they have hardness suited to seal applications and the like as a thin rubber member, they are rubber materials suitable for a degradable seal member for downhole tools.

These polyamide-based thermoplastic elastomers may be each used alone but may also be used as a mixture with other thermoplastic elastomers and/or resin materials.

Sealing of Downhole by Diameter-Expandable Annular Seal Member

To achieve reliable sealing of a downhole tool, the diameter-expandable annular seal member 2 of the present invention preferably is disposed on an outer circumferential surface orthogonal to an axial direction of a mandrel 1, and at least one annular member expands in diameter due to compression in an axial direction and plugs a gap between the inner wall H of the downhole and the diameter-expandable annular seal member 2, and at least one other annular member has a function of blocking fluid by plugging a gap between the outer circumferential surface of the mandrel 1 and the diameter-expandable annular seal member 2.

Plugging by the annular member described above may occur due to the portion of the annular member itself that is in contact with the mandrel 1 being directly compressed in the axial direction of the mandrel 1, or may occur due to another member, for example, a ring 5a or 5b to be described later, moving in the axial direction of the mandrel 1 and expanding.

The diameter-expandable annular seal member 2 of the present invention comprises two or more annular members distributed along the axial direction, and preferably, as described previously, they are configured so as to plug the gap between the inner wall H of the downhole and the diameter-expandable annular seal member 2, and then plug the gap between the outer circumferential surface of the mandrel 1 and the diameter-expandable annular seal member 2, thereby having the function of blocking fluid.

Taking as an example a diameter-expandable annular seal member 2 in which a center annular member and two end annular members, which are three annular members distributed along the axial direction, are adjacent along the axial direction, the specific actions of (i) to (iii) below are hypothesized.

Specifically, (i) one of the annular members, specifically the center annular member, expands in diameter in the direction orthogonal to the axial direction of the mandrel 1 as the distance in the axial direction decreases (shrinks in diameter) due to being compressed in the axial direction via, for example, a pair of rings 5a and 5b or the like to be described later.

As a result of the diameter expansion of the center annular member proceeding, the outward tip part in the radial direction of the center annular member comes in contact with the inner wall H of the downhole, and plugging of the gap between the inner wall H of the downhole and the diameter-expandable annular seal member 2 begins.

(ii) Then, when diameter expansion of the center annular member continues further, the area of the outward tip part in the radial direction of the center annular member that comes in contact with the inner wall H of the downhole (contact area between downhole and inner wall H) increases, and the gap between the inner wall H of the downhole and the diameter-expandable annular seal member 2 is plugged and firmly sealed.

(iii) As a result of the deformation of the center annular member increasing, the strength of the center annular member increases dramatically, and a force that induces deformation in the two end annular members, specifically a force that expands the diameter of the contact site between the two end annular members and the center annular member, acts via the site at which the center annular member and the two end annular members are adjacent and come into contact.

As a result, a force acts to press on the outer circumferential surface of the mandrel 1 at the contact site between the two end annular members and the outer circumferential surface of the mandrel 1 located on the side opposite the contact site with the center annular member, and the gap between the mandrel 1 and the diameter-expandable annular seal member 2 is plugged and firmly sealed.

Note that it is hypothesized that (iii) acts in parallel with (ii).

Based on the above hypothesized actions, to firmly and reliably achieve a function of blocking fluid by plugging a downhole with the diameter-expandable annular seal member 2 of the present invention, it is preferred that plugging of the gap between the inner wall H of the downhole and the diameter-expandable annular seal member 2 by the action of (i) occur first.

Thus, in the specific example given above, it is understood that, in order that the action of (i) occurs first, the center annular member is preferably made to be relatively easily deformed by adjusting the compositions of the center annular member and the two end annular members (selection of the degradable polymer materials, blending of blended agents or fillers, and the like) or the design of the annular members (adjustment of thickness, adjustment of volume, presence or absence of under, and the like) such that the center annular member expands in diameter before the two end annular members do.

For example, the hardness of the center annular member may be set in the range of A60 to A100, the hardness of the two end annular members may be set in the range of A60 to D80, and the hardness of the center annular member may be set to a lower value than the hardness of the two end annular members, but this is not mandatory.

Axial-Direction Length, Thickness, Size, and the Like of Annular Members

From the perspective of achieving the function of blocking fluid by plugging the gap between the inner wall H of the downhole and the diameter-expandable annular seal member 2 by means of the center annular member expanding in diameter first, the length in the mandrel axial direction of at least one of the annular members (appropriately the above center annular member) that plug the gap between the inner wall H of the downhole and the diameter-expandable annular seal member 2 is preferably from 20 to 80%, more preferably from 25 to 75%, and even more preferably from 30 to 70%, of the length of the diameter-expandable annular seal member 2 in the axial direction of the mandrel 1.

Furthermore, the thickness and size of the two or more annular members distributed along the axial direction provided in the diameter-expandable annular seal member 2 may be adjusted as described previously. For example, the thickness of the annular member is normally in the range of 0.5 to 20 mm, and often in the range of 1 to 10 mm.

Other Blended Components

The diameter-expandable annular seal member 2 of the present invention may be formed from a composition which, in addition to the degradable polymer material, preferably a degradable rubber material, and particularly preferably urethane rubber, may also contain or be blended with various additives as other blended components, such as other types of rubber materials or resin materials, reinforcing materials, stabilizers, and degradation accelerators or degradation inhibitors, within a range that does not hinder the object of the present invention.

Furthermore, by adding pigments or dyes, the diameter-expandable annular seal member 2 may be formed from a colored composition of degradable polymer material having various identification functions, such as brand colors.

In particular, by using a composition of degradable rubber material containing other degradable materials as other blended components, it is possible to increase and adjust as necessary the degradability and disintegrability of the diameter-expandable annular seal member 2 of the present invention.

For example, it is possible to make the diameter-expandable annular seal member 2 lose its original strength and lose its original shape and become degradable by degradation of the other degradable materials contained as other blended components in the degradable rubber material that forms the diameter-expandable annular seal member 2.

Examples of degradable materials contained as other blended components include known degradable resins such as aliphatic polyesters such as PGA, PLA, and PGLA, and mixtures thereof.

Furthermore, as the degradable rubber material that forms the diameter-expandable annular seal member 2 of the present invention, it is also possible to use a blend with another rubber material, such as nitrile rubber, isoprene rubber, ethylene propylene rubber, butyl rubber, styrene rubber (styrene-butadiene rubber and the like), fluorine rubber, and silicone rubber, in the range of 5 to 150 parts by mass, preferably 10 to 100 parts by mass, relative to 100 parts by mass of, for example, urethane rubber.

Additionally, for example, as previously described, nitrile rubber is normally not suitable for the degradable rubber material, but when the diameter-expandable annular seal member 2 is formed using a blend with a degradable rubber, particularly with urethane rubber which has a high 150° C. 24-hour compressive stress decrease, there are cases where the diameter-expandable annular seal member and the plug for well drilling can be relatively easily retrieved because the nitrile rubber also cannot maintain its shape due to the fact that the urethane rubber readily degrades or disintegrates.

Degradation Accelerator

As the diameter-expandable annular seal member 2 of the present invention, the above degradable polymer material that forms the degradable seal member for downhole tools which is that diameter-expandable annular seal member 2 preferably contains from 0.1 to 20 parts by mass of a degradation accelerator relative to 100 parts by mass of the degradable polymer material.

Furthermore, as described above, the degradable polymer material is preferably a degradable rubber material, and more preferably at least one of rubber material selected from the group consisting of urethane rubber, acrylic rubber, polyester-based thermoplastic elastomer, polyamide-based thermoplastic elastomer, natural rubber, isoprene rubber, ethylene propylene rubber, butyl rubber, styrene rubber, aliphatic polyester rubber, and chloroprene rubber.

In the diameter-expandable annular seal member 2 of the present invention, the degradation accelerator contained in the above degradable polymer material is a blended agent that can accelerate degradation or disintegration of the degradable polymer material in the downhole environment in which the degradable seal member for downhole tools is used. In particular, it is a blended agent contained in the degradable polymer material that can accelerate degradation of the degradable polymer material, especially hydrolysis.

A blended agent having a function of breaking the bonds of the main chain of the molecules of the degradable polymer material or having a function of plasticizing the degradable polymer material is preferred as the degradation accelerator because it is anticipated to have an effect of reliably degrading the degradable polymer material, and therefore, acidic substances and plasticizers are cited as preferred degradation accelerators.

Furthermore, the degradation accelerator preferably contains at least one selected from the group consisting of organic acids, inorganic acids, organic acid esters, inorganic acid esters, and acid anhydrides.

Acidic Substance

Acidic substances are cited as preferred degradation accelerators in the diameter-expandable annular seal member 2 of the present invention.

Due to the fact that acidic substances break the bonds of the main chain of the degradable polymer material that forms the degradable seal member for downhole tools, they accelerate degradation of that seal member, and as a result, accelerate degradation of the diameter-expandable annular seal member 2.

Specifically, it is hypothesized that when the degradable seal member for downhole tools is formed from a degradable polymer material containing an acidic substance, the acidic substance normally is present in a uniformly dispersed state in the degradable polymer material, and therefore, the acidic substance contacts the molecules of the degradable polymer material substantially, and as a result, degradation of the degradable polymer material proceeds at higher speed than when degradation proceeds from the surface of the seal member, as is the case when, for example, the degradable seal member for downhole tools formed from a degradable polymer material is immersed in water (optionally containing an acidic substance).

The acidic substance may be an acidic substance in the narrow sense such as an acid, or it may be an acid-producing substance that hydrolyzes to produce acid under certain conditions, for example, when immersed in water.

In addition to acids such as organic acids and inorganic acids, examples of acid-producing substances include acid-producing substances known themselves as acid precursors, such as derivatives of hydrolyzable acids such as dimers, trimers, oligomers, or polymers of oxycarboxylic acids, derivatives of organic acids with higher reactivity such as the sulfonic acid derivative sulfonic acid ester (which qualifies as an organic acid ester), sulfonamides, acid anhydrides, and the like, and preferably organic acid esters, inorganic acid esters, and inorganic anhydrides.

The acidic substance needs to be something that does not degrade, volatilize, or disappear during the time until the degradable seal member for downhole tools is formed from the degradable polymer material containing a prescribed amount of acidic substance (during polymerization of the degradable polymer material, during melt-kneading or melt-molding, and the like).

Specific examples include saturated fatty acids having from 8 to 20 carbons, such as lauric acid; oxycarboxylic acids, such as glycolic acid, lactic acid, phosphoric acid, glycolide, glycolic acid oligomer, polyglycolic acid (PGA), lactide, lactic acid oligomer, and polylactic acid (PLA), or derivatives thereof; sulfonic acid derivatives, such as methyl p-toluene sulfonate (MPTS), o/p-toluene sulfonamide, and N-butylbenzene sulfonamide; acid anhydrides such as 3,3', 4,4'-benzophenone tetracarboxylic acid dianhydride (BTDA); and the like.

Particularly preferably, the degradation accelerator contains at least one selected from the group consisting of lauric acid, glycolic acid, lactic acid, phosphoric acid, glycolide, lactide, PGA, PLA, MPTS, and BTDA.

The acidic substance may be in a miscible state in the degradable polymer material that forms the diameter-expandable annular seal member 2, or may be dispersed in granular form (also called "particulate form").

For example, when an acidic substance is included in the urethane rubber which is the degradable rubber preferably used as the degradable polymer material, glycolide or MPTS is often in the miscible state, and PGA or BTDA is often dispersed in the granular state.

Furthermore, cases where lauric acid is dispersed in the miscible state and the granular state depending on temperatures and the like have also been seen.

In either case, it has the effect of accelerating degradation of the degradable rubber, but the degradation accelerating effect is larger when in a miscible state.

Plasticizer

Additionally, plasticizers are also cited as preferred degradation accelerators in the diameter-expandable annular seal member 2 of the present invention.

It is hypothesized that, as a result of plasticizers having a function of plasticizing (decreasing torque, softening, and the like) the degradable polymer material that forms the diameter-expandable annular seal member 2, infiltration of water (optionally containing an acidic substance or alkaline substance), which degrades, e.g., hydrolyzes, the degradable polymer material in the diameter-expandable annular seal member 2, is accelerated, and therefore, similar to what was described previously in regard to acidic substances, degradation of the degradable polymer material proceeds more quickly than when degradation proceeds from the surface of the diameter-expandable annular seal member 2.

Examples of plasticizers include dibutyl phthalate, diisononyl phthalate, dioctyl phthalate, dioctyl adipate, diisononyl adipate, dibutyl sebacate, and the like. Since the presence or absence and the magnitude of the plasticizing effect on degradable rubber differs, the advantageous type of plasticizer is determined in combination with the degradable rubber.

Use of Degradation Accelerator

In addition to the acidic substances and plasticizers cited as preferred examples of degradation accelerators, other substances that exhibit the effect of accelerating degradation, especially hydrolysis, of the degradable polymer material may be used.

The degradation accelerator may contain one compound alone, or may contain two or more compounds, and further, may contain an acidic substance and a plasticizer, for example.

Additionally, as described previously in regard to the acidic substance, it may be miscible or granular, but needs to be something that does not degrade, volatilize, or disappear during the time until the diameter-expandable annular seal member 2 is formed from the degradable polymer material (during polymerization of the degradable polymer material, during melt-kneading or melt-molding, and the like).

The optimal range of content of the degradation accelerator may be selected depending on the combination of degradation accelerator and degradable polymer material, but the degradation accelerator has a degradation accelerating effect on the degradable polymer material when in the range of, normally, from 0.1 to 20 parts by mass, often from 0.3 to 15 parts by mass, and in nearly all cases from 0.5 to 10 parts by mass, relative to 100 parts by mass of the degradable polymer material.

When the content of degradation accelerator is too low, the degradation accelerating effect on the degradable polymer material is unsatisfactory and there is risk that the diameter-expandable annular seal member 2 will not degrade and the seal will not be released within the desired time, and the effects of reducing expense and shortening the processes of well drilling may be lost.

When the content of degradation accelerator is too high, there is risk that the seal will be released before the time for which fluid sealing by the degradable seal member for downhole tools is required in well treatment such as fracturing has elapsed.

It is therefore possible to control degradation speed by means of the type or the content of the degradation accelerator.

Due to the fact that the diameter-expandable annular seal member 2 of the present invention is formed from a degradable polymer material containing from 0.1 to 20 parts by mass of degradation accelerator relative to 100 parts by mass of degradable polymer material, degradation of the polymer material is accelerated. Thus, releasing of the seal by the degradable seal member for downhole tools which is a diameter-expandable annular seal component 2, which is performed after well treatment has ended or after well drilling have been completed, can be performed at a lower temperature and/or in a shorter time. As a result, the seal can be released in a desired time based on diversification of excavation conditions, and the expense of well drilling can be reduced and the processes shortened.

Additionally, because the degradable polymer material that forms the degradable seal member for downhole tools can be degraded from the interior rather than from the surface of the seal member, the degradable seal member for downhole tools after the seal is released can be more finely pulverized than in the past, and as a result, the retrieval operation can be performed easily and rapidly after well treatment has ended or after well drilling have been completed.

Reinforcing Material

The diameter-expandable annular seal member 2 of the present invention preferably contains a reinforcing material as another blended component in addition to the degradable polymer material, e.g., degradable rubber material, specifically urethane rubber.

As reinforcing materials, the same materials such as resin materials conventionally used as reinforcing materials with the objective of improving mechanical strength or heat resistance as those described in regard to the mandrel 1 may be used, and the fibrous reinforcing materials or granular or powdered reinforcing materials described in regard to the mandrel 1 may be used.

The reinforcing materials may be contained typically in the amount of not greater than 150 parts by mass, and preferably in the range of 10 to 100 parts by mass, relative to 100 parts by mass of the degradable polymer material, e.g., degradable rubber material.

The plug for well drilling of the present invention, i.e., the plug for well drilling comprising a mandrel 1 and the above diameter-expandable annular seal member 2, may comprise a plurality of diameter-expandable annular seal members 2 formed from degradable polymer material, and by so doing, it can plug (seal) the space between the plug and the borehole at a plurality of positions, and the function of assisting to fix the borehole and the plug can be achieved even more reliably.

Note that when the plug for well drilling of the present invention comprises a plurality of diameter-expandable annular seal members 2, the length of the diameter-expandable annular seal members 2 in the axial direction of the mandrel 1 described above refers to the total of the lengths of the plurality of diameter-expandable annular seal members 2 in the axial direction of the mandrel 1.

When the plug for well drilling of the present invention comprises a plurality of diameter-expandable annular seal members 2, the diameter-expandable annular seal members 2 may have the same or different materials, shapes, and structures.

In addition, a plurality of diameter-expandable annular seal members 2 may be disposed adjacently or at a distance from one another at positions between a pair of rings 5a and 5b to be described in detail later, or may be disposed at positions between each pair of a plurality of pairs of rings 5a and 5b.

When the diameter-expandable annular seal member 2 is constituted of a center annular member and two end annular members along the axial direction, either one or both of the center annular member and two end annular members, for example, may be annular members (rubber member) having a structure formed from laminated rubber or a plurality of polymer materials (rubber or the like).

In addition, it may be provided with one or more grooves, convex parts, rough surfaces (corrugation), or the like at the parts of the diameter-expandable annular seal member 2 that make contact with the inner wall H of the borehole in order to further ensure plugging (sealing) of the space between the plug and the downhole as well as fixing of the borehole and the plug when expanded.

3. Slips and Wedges

The plug for well drilling of the present invention, i.e., the plug for well drilling comprising the mandrel 1 and the diameter-expandable annular seal member 2, preferably comprises at least one slip 3, disposed on the outer circumferential surface orthogonal to the axial direction of the mandrel 1.

The slip 3 may be provided in combination with a wedge 4.

That is, a plug for well drilling comprising at least one wedge 4 disposed on the outer circumferential surface orthogonal to the axial direction of the mandrel 1 is preferred.

The slip 3, preferably the combination of the slip 3 and the wedge 4, is itself well known as a means for fixing the plug and the borehole in a plug for well drilling.

That is, the slip 3 formed from a metal, inorganic matter, or the like is often disposed in slidable contact with the sloping upper surface of the wedge 4 formed from a composite material or the like, and when a force in the axial direction of the mandrel 1 is applied to the wedge 4 by the method described above, the slip 3 moves outward in a direction orthogonal to the axial direction of the mandrel 1 so as to make contact with the inner wall H of the borehole and to fix the plug and the inner wall H of the borehole.

The slip 3 does not necessarily have to be provided in combination with a wedge 4 as long as it serves the function of fixing the plug and the inner wall H of the borehole by moving outward orthogonal to the axial direction of the mandrel 1 and making contact with the inner wall H of the borehole.

The slip 3 may be provided with one or more grooves, convex parts, rough surfaces (corrugation), or the like at the part making contact with the inner wall H of the borehole in order to make the plugging (sealing) of the space between the plug and the borehole even more reliable.

In addition, the slip 3 may be divided into a prescribed number in the circumferential direction orthogonal to the axial direction of the mandrel 1. Alternatively, as illustrated in FIG. 1A, the slip 3 may have notches beginning at one end along the axial direction and ending at an intermediate point in the direction of the other end without being divided into a prescribed number in advance (when the slip 3 is provided in combination with a wedge 4, a force in the axial direction of the mandrel 1 is applied to the wedge 4, and the wedge 4 penetrates into the lower surface of the slip 3 so that, as illustrated in FIG. 1B, the slip 3 is divided along the notches and the extended lines thereof, and each divided piece of the slip 3 then moves outward in a direction orthogonal to the axial direction of the mandrel 1).

The plug for well drilling of the present invention, i.e., the plug for well drilling comprising the mandrel 1 and the diameter-expandable annular seal member 2, may be a plug for well drilling comprising a diameter-expandable annular assisting member disposed on an outer circumferential surface orthogonal to the axial direction of the mandrel 1, where the annular assisting member is capable of expanding in diameter to mitigate deformation incurred at the time of sealing action of at least one annular member that plugs the gap between the inner wall H of the downhole and the diameter-expandable annular seal member 2.

For example, the wedge 4 may be used as a diameter-expandable annular assisting member capable of expanding in diameter to mitigate deformation of the at least one annular member.

By so doing, when an annular member provided in the diameter-expandable annular seal member 2, specifically the center annular member, deforms in the direction of fluid pressure and bends in point contact or line contact, for example, with the end portion of the wedge 4 due to high fluid pressure incurred in fracturing and the like, fluid pressure can be mitigated and the seal that blocks the fluid can be maintained because the wedge 4 makes surface contact with the center annular member by expanding in diameter.

As a result, plugging of the downhole by the diameter-expandable annular seal member 2 is reliably maintained, and there is no hindrance to the implementation of fracturing.

The plug for well drilling of the present invention is preferably a plug for well drilling comprising a pair of rings 5a and 5b disposed on the outer circumferential surface orthogonal to the axial direction of a mandrel 1, wherein at least one degradable seal member for downhole tools 2, which is a diameter-expandable annular seal member formed from a degradable polymer material, preferably a degradable rubber material, is provided between the pair of rings 5a and 5b.

That is, according to the above plug for well drilling, for example, by placing a slip 3 or a combination of a slip 3 and a wedge 4 adjacently to the diameter-expandable annular seal member 2, it is easy to apply force in the axial direction of the mandrel 1 to the slip 3 or the combination of the slip 3 and wedge 4.

As illustrated in FIG. 1A, the plug for well drilling of the present invention may be provided with a plurality of combinations of slip 3 and wedge 4 (combinations of slips 3a and 3b and wedges 4a and 4b), and in that case, they may be disposed adjacently so as to sandwich the diameter expandable annular seal member 2, or they may be disposed at other positions.

When the plug for well drilling of the present invention is provided with a plurality of diameter-expandable annular seal members 2, the arrangement of the combinations of slips 3a and 3b and wedges 4a and 4b relative to the plurality of diameter-expandable annular seal members 2 can be selected appropriately as desired.

Degradable Material

For the slip 3, preferably the combination of the slip 3 and wedge 4 (including combinations of slips 3a and 3b and wedges 4a and 4b when provided with a plurality of combinations of slip 3 and wedge 4), provided in the plug for well drilling of the present invention, either one or both of the slip 3 and the wedge 4 may be formed from a degradable material, and furthermore, either one or both of the slip 3 and the wedge 4 may be a composite material containing a reinforcing material (reinforced resin) as desired, as long as the plug can be fixed in the downhole by the slip 3.

Additionally, a metal or an inorganic matter may also be incorporated into the degradable material.

As the degradable material or the reinforcing material, the same materials as described above may be used.

Thus, either one or both of the slip 3 and the wedge 4 may be formed from a degradable material, and, similar to the conventional case, they may be formed from a material containing at least one of a metal and inorganic matter.

Additionally, one or both of the slip 3 and the wedge 4 may be something in which a member of metal or inorganic matter has been incorporated in the degradable material, that is, something formed from a material containing a degradable material and at least one of a metal and inorganic matter (a composite material of a degradable material and a metal or inorganic matter).

Specific examples of the slip 3 or the wedge 4 that is a composite material of a degradable material and a metal or inorganic matter include a slip 3 or a wedge 4 formed by providing a cavity of a prescribed shape in a parent material formed from a degradable material such as a degradable resin, for example, PGA, inlaying metal (metal fragments or the like) or inorganic matter having a shape that conforms to the shape of the cavity, and fixing these with an adhesive or by wrapping with wire, fibers, or the like such that the metal fragments or organic matter and the parent material can maintain a fixed state.

This combination of slip 3 and wedge 4 has the function of fixing the plug for well drilling inside the well due to the metal fragments or inorganic matter contacting the inner wall H of the borehole due to the parent material of the slip 3 getting stuck on top of the wedge 4 when actuated.

4. Rings

As described above, the plug for well drilling of the present invention is preferably a plug for well drilling comprising a pair of rings 5a and 5b disposed on the outer circumferential surface orthogonal to the axial direction of a mandrel 1, wherein at least one diameter-expandable annular seal member 2 formed from a degradable polymer material (for example, constituted of a center annular member and two end annular members along the axial direction) is provided between the pair of rings 5a and 5b.

Due to the plug for well drilling of the present invention comprising at least one diameter-expandable annular seal member 2, and, preferably at least one slip 3 and wedge 4, disposed on the outer circumferential surface orthogonal to the mandrel 1, it can plug and fix the space between the plug and the downhole.

Due to the plug for well drilling of the present invention further comprising the above pair of rings 5a and 5b, the pair of rings 5a and 5b can effectively apply a force in the axial direction of the mandrel 1 to the diameter-expandable annular seal member 2 disposed on the outer circumferential surface orthogonal to the axial direction of the mandrel 1 and/or to the slip 3 via the wedge 4.

Specifically, due to the pair of rings 5a and 5b being configured such that they can slide along the axial direction of the mandrel 1 on the outer circumferential surface of the mandrel 1 and such that the spacing (distance) therebetween can be changed, and additionally, due to being configured so as to make contact with the diameter-expandable annular seal member 2 and/or the end parts of the slips 3a and 3b along the axial direction of the mandrel 1, either directly or indirectly via the wedges 4a and 4b (as a combination of slips 3a and 3b and wedges 4a and 4b in FIG. 1A), they can easily apply a force in the axial direction of the mandrel 1 to those members.

The shape and size of each ring of the pair of rings 5a and 5b are not particularly limited as long as the rings 5a and 5b achieve the functions described above. From the perspective of being able to effectively apply a force in the axial direction of the mandrel 1 to the diameter-expandable annular seal member 2 and/or the slips 3a and 3b, with the wedges 4a and 4b interposed if desired, the end surface of the rings on the side making contact with these members preferably has a flat shape.

Each ring of the pair of rings 5a and 5b is preferably a circular ring which completely surrounds the outer circumferential surface of the mandrel 1. It may also have breaks or deformed places in the circumferential direction. For example, diameter expansion of the ring 5a or 5b may cause movement of the above two or more annular members provided in the diameter-expandable annular seal member 2.

In addition, as for the shape in which the circle is separated in the circumferential direction, the circle may be formed as desired.

As each of the rings of the pair of rings 5a and 5b, a plurality of rings may be disposed adjacently in the axial direction so as to form a wide ring (with a long length in the axial direction of the mandrel 1).

Additionally, these may be considered to be rings that form the pair of rings 5a and 5b in the plug for well drilling of the present invention, including members that contribute to effectively applying a force in the axial direction of the mandrel 1 to the diameter-expandable annular seal member 2 and/or the slips 3a and 3b, with the wedges 4a and 4b interposed if desired.

The pair of rings 5a and 5b may have the same or similar shapes and structures, or may have different shapes and structures.

For example, each ring of the pair of rings 5a and 5b may differ in outer diameter or length in the axial direction of the mandrel 1.

In addition, for example, one of the rings of the pair of rings 5a and 5b may be configured in a state in which it cannot slide relative to the mandrel 1, as desired.

In this case, the other ring of the pair of rings 5a and 5b slides on the outer circumferential surface of the mandrel 1 to come into contact with the end part along the axial direction of the combinations of the slips 3a and 3b and wedges 4a and 4b, which are disposed as desired, and/or the diameter-expandable annular seal member 2.

The configuration in which one of the rings of the pair of rings 5a and 5b cannot slide relative to the mandrel 1 as desired is not particularly limited. For example, the mandrel 1 and one ring of the pair of rings 5a and 5b may be formed integrally (in this case, the ring in question cannot usually slide relative to the mandrel 1), or a clutch structure such as a dog clutch or a fitting structure may be used (in this case, it is possible to switch between a state in which the ring can slide relative to the mandrel 1 and a state in which the ring cannot slide relative to the mandrel 1).

As a plug for well drilling in which the mandrel 1 and one of the rings of the pair of rings 5a and 5b are formed integrally, a plug for well drilling in which these members are formed by integral molding or a plug for well drilling formed by machining is provided.

Furthermore, the plug for well drilling of the present invention may be provided with a plurality of pairs of rings 5a and 5b.

In this case, they can be disposed in locations between the plurality of pairs of rings of the diameter-expandable annular seal member 2 and/or the combinations of the slips 3a and 3b and wedged 4a and 4b, which are disposed as desired, each separately or in combinations.

Degradable Material

The material that forms the pair of rings 5a and 5b is not particularly limited as long as the pair of rings 5a and 5b can effectively apply a force in the axial direction of the mandrel 1 to the diameter-expandable annular seal member 2 and/or the slips 3, with the wedges 4 interposed if desired, but at least one of the rings (5a or 5b) may be formed from a degradable material.

As the degradable material that forms at least one ring of the pair of rings 5a and 5b, the same degradable materials as described above in regard to the mandrel 1 may be used.

Thus, the degradable material that forms at least one ring of the pair of rings 5a and 5b is preferably a degradable resin, more preferably an aliphatic polyester, and even more preferably polyglycolic acid.

The degradable material may be one that also contains a reinforcing material, particularly one formed from an aliphatic polyester containing a reinforcing material.

When both of the rings of the pair of rings 5a and 5b are formed from a degradable material, the types and compositions of the resin of the degradable material may be the same or different.

When one of the pair of rings 5a and 5b is formed from a degradable material, a metal such as aluminum or iron or a composite material of a reinforced resin or the like can be used as the material for forming the other ring.

5. Plug for Well Drilling

The plug for well drilling of the present invention is a degradable seal member for downhole tools comprising a mandrel and at least one degradable seal member for downhole tools which is a diameter-expandable annular seal member disposed on the outer circumferential surface orthogonal to the axial direction of the mandrel, wherein at least one diameter-expandable annular seal member comprises two or more annular members distributed along an axial direction, and the annular members are formed from a degradable polymer material having hardness in a range from A60 to D80.

As previously described, the plug for well drilling of the present invention may comprise a slip; a wedge, which, in combination with the slip, can act as a diameter-expandable annular assisting member that can expand in diameter to mitigate deformation of at least one annular member that plugs the gap between the inner wall of a downhole and a diameter-expandable annular seal member; a pair of rings; as well as other members normally provided in plugs for well drilling.

For example, when the mandrel has a hollow part along the axial direction, the plug for well drilling of the present invention may comprise a ball (formed from a material such as metal or resin, and may also be formed from a degradable material), which is disposed in the hollow part and controls the flow of fluid.

Furthermore, the plug for well drilling and/or members thereof may comprise a member, e.g., an anti-rotation member or the like, for linking to and releasing from the members or other members.

The plug for well drilling of the present invention may also be formed entirely from degradable materials.

Plugging of Borehole

The plug for well drilling of the present invention is a degradable seal member for downhole tools in which the diameter-expandable annular seal member comprises two or more annular members distributed along the axial direction, and the annular members are diameter-expandable annular seal members formed from a degradable polymer material having hardness in the range of A60 to D80. As a result, for example, by applying force in the axial direction of the mandrel 1 to a pair of rings, at least one annular member expands in diameter in the direction orthogonal to the axial direction of the mandrel as it is compressed and shrinks in diameter in the axial direction, The at least one annular member expands in diameter to plug the gap between the inner wall of the downhole and the diameter-expandable annular seal member.

Normally, at least one other annular member is then, for example, compressed in the axial direction, and as a result, it plugs the gap between the outer circumferential surface of the mandrel and the diameter-expandable annular seal member, thereby blocking fluid.

Furthermore, when the aforementioned plugging (sealing) or the like is performed in a downhole which is a high-temperature environment where the degradable seal member for downhole tools ends up degrading in a short time, a treatment method can be employed in which the seal performance (strength and the like) can be maintained for a desired time by controlling the ambient temperature of the degradable seal member for downhole tools by injecting fluid from the ground (cooldown injection).

Degradation of Plug for Well Drilling

With the plug for well drilling of the present invention, the diameter-expandable annular seal member, and, as desired, a degradable mandrel, slip, pair of rings, and the like, can be easily degraded to remove them by biodegradation, hydrolysis, or chemical degradation by some other method typically after fracturing of the prescribed section is finished and production of petroleum or natural gas or the like begins after well drilling is finished and the well has been completed. Furthermore, the operations of retrieving and physically destroying members for downhole tools such as plugs for well drilling which have been conventionally performed can be made completely unnecessary.

According to the plug for well drilling of the present invention, the substantial cost and time conventionally required to remove, retrieve, or destroy or fragmentize, by pulverization, perforation, or another method, the many plugs for well drilling remaining inside a well after the completion of the well become unnecessary, which makes it possible to reduce the expense and shorten the processes of well drilling.

Furthermore, it is preferred that the degradable seal member for downhole tools remaining after the well treatment has been completed disappears completely by the time production is begun, but even if it does not disappear completely, as long as it is in a state where its strength decreases and it can be disintegrated by stimulation such as water flow in the downhole, the disintegrated degradable seal member for downhole tools can be easily retrieved by flowback or the like, and since it does not cause clogging in the downhole or fractures, it does not hinder production of the petroleum, natural gas, or the like.

Normally, the higher the downhole temperature, the shorter the time required for degradation and strength decrease of the degradable seal member for downhole tools.

Furthermore, the moisture content in the subterranean formation is sometimes low depending on the well, and in this case, degradation of the plug for well drilling can be accelerated by allowing the water-based fluid used during fracturing to remain in the well without recovering it after fracturing.

II. Method for Manufacturing Plug for Well Drilling

The method for manufacturing the plug for well drilling of the present invention is not limited as long as it can manufacture a plug for well drilling comprising the mandrel and the diameter-expandable annular seal member having a specified structure and composition described above.

For example, each of the members provided in the plug for well drilling is molded by injection molding, extrusion molding (including solidification-and-extrusion molding), centrifugal molding, compression molding, or another known molding method, and after each of the obtained members is machined such as by cutting or perforating as necessary, they may be combined by known methods to produce a plug for well drilling.

III. Method for Well Drilling

According to the method for well drilling of the present invention, that is, according to a method for well drilling in which isolation treatment of a borehole is performed using a degradable seal member for downhole tools, preferably using a plug for well drilling comprising the degradable seal member for downhole tools, and then the degradable seal member for downhole tools, preferably all or a part of the plug for well drilling comprising a mandrel and the degradable seal member for downhole tools, is degraded, a diameter-expandable annular seal member that is plugging the borehole, and, as desired, a degradable mandrel and a slip or the like that is plugging the borehole, can be easily degraded to remove them by biodegradation, hydrolysis, or chemical degradation by some other method after fracturing of the prescribed section is finished or when production of petroleum or natural gas or the like begins after well drilling is finished and the well has been completed.

Accordingly, the fact that the degradable seal member for downhole tools is degraded after isolation treatment of a borehole is performed using the degradable seal member for downhole tools of the present invention provides the following advantages: (i) the seal for preventing movement of fluid inside the well can be released because the seal part is degraded; (ii) unnecessary downhole tools that hinder production are easy to remove; (iii) a downhole tool that requires no fracturing treatment before the start of production is obtained due to the fact that other members for downhole tools provided in the downhole tool are formed from a degradable material; (iv) it can be applied to various downhole tools used in a diversity of processes in which any sort of sealing is required, without limitation to downhole tools used in fracturing processes.

As a result, according to the method for well drilling of the present invention, the substantial cost and time conventionally required to remove, retrieve, or destroy or fragmentize, by pulverization, perforation, or another method, the many plugs for well drilling or sealing member remaining inside a well after the completion of the well become unnecessary, which makes it possible to reduce the expense and shorten the processes of well drilling.

Specific aspects of the method for well drilling of the present invention provide, preferably, a method for well drilling in which a degradable seal member for downhole tools is degraded inside a borehole after the borehole is sealed using the degradable seal member for downholes which is the diameter-expandable annular seal member described above, in which the annular members have a tensile fracture strain at 66° C. of not less than 50%, a 70% strain compressive stress of not less than 10 MPa, and a compressive fracture strain of not less than 50%; a method for well drilling that uses a downhole tool comprising another member for downhole tools containing a degradable material; and a method for well drilling that uses a downhole tool in which the above degradable seal member for downhole tools abuts another member for downhole tools.

INDUSTRIAL APPLICABILITY

According to a first aspect of the present invention, a degradable seal member for downhole tools which is the seal member being a diameter-expandable annular seal member, the diameter-expandable annular seal member comprising two or more annular members distributed along an axial direction, the annular members being formed from a degradable polymer material having hardness in a range from A60 to D80 is provided. The present invention has high industrial applicability because it exhibits the effect that, based on the fact that excavation conditions have become more harsh and diverse such as increased depth, it can perform sealing in downholes used in many applications, such as reliable sealing of boreholes to withstand the high fluid pressure of fracturing and the like, and it is easy to remove and makes it easy to secure a flow path, thereby reducing expense and shortening processes of well drilling.

Furthermore, according to another aspect of the present invention, a plug for well drilling comprising a mandrel and at least one of the above degradable seal members for downhole tools disposed on the outer circumferential surface orthogonal to the axial direction of the mandrel, and additionally, and a method for well drilling in which a degradable seal member for downhole tools is degraded after a borehole underwent isolation treatment using the above degradable seal member for downhole tools, preferably using a plug for well drilling comprising a mandrel and the degradable seal member for downhole tools are provided. The present invention has high industrial applicability because, based on the fact that excavation conditions have become more harsh and diverse such as increased depth, it can perform reliable sealing of boreholes to withstand the high fluid pressure of fracturing and the like, and it is easy to remove and makes it easy to secure a flow path, thereby reducing expense and shortening processes of well drilling.

REFERENCE SIGNS LIST

1: Mandrel
2: Diameter-expandable annular seal member (degradable seal member for downhole tools)
3a, 3b: Slips
4a, 4b: Wedges
5a, 5b: Rings
H: Inner wall of downhole (borehole)

The invention claimed is:

1. A degradable seal member for downhole tools, the member being a diameter-expandable annular seal member, the diameter-expandable annular seal member comprising:
three annular members distributed along an axial direction, wherein:
the annular members being formed from a degradable polymer material having durometer hardness in a range from type A (A60) to type D (D80),
of the three annular members, a center annular member and two end annular members of the annular members being adjacent along the axial direction, and
a length of the center annular member in the axial direction being 30 to 70% of a length of the diameter-expandable annular seal member in the axial direction.

2. The degradable seal member for downhole tools according to claim 1, wherein, in each of the polymer materials that form the two or more annular members, a difference in time taken for a decrease in 50% strain compressive stress of 50% strain compressive stress after immersion in 150° C. water relative to a 50% strain compressive stress before immersion to be not less than 5% is within 2 days.

3. The degradable seal member for downhole tools according to claim 1, wherein a loss rate of mass of the polymer material that form the annular members after immersion for 72 hours in 150° C. water relative to a mass before immersion is from 5 to 100%.

4. The degradable seal member for downhole tools according to claim 1, wherein the member polymer material that form the annular members is stable in a dry environment, and a decrease of 50% strain compressive stress after immersion for 6 hours in 23° C. water relative to a 50% strain compressive stress after immersion for 1 hour is less than 5%.

5. The degradable seal member for downhole tools according to claim 1, wherein the annular members have a tensile fracture strain at 66° C. of not less than 50%, a 70% strain compressive stress of not less than 10 MPa, and a compressive fracture strain of not less than 50%.

6. The degradable seal member for downhole tools according to claim 1, wherein, in the annular members, a ratio of compressive stress at 70% compressive strain relative to a compressive stress at 5% compressive strain at 66° C. is not less than 5:1.

7. The degradable seal member for downhole tools according to claim 1, wherein the diameter-expandable annular seal member is disposed on an outer circumferential surface orthogonal to an axial direction of a mandrel, and at least one annular member expands in diameter due to compression in an axial direction and plugs a gap between an inner wall of a downhole and the diameter-expandable annular seal member, and at least one other annular member has a function of blocking fluid by plugging a gap between the mandrel and the diameter-expandable annular seal member.

8. The degradable seal member for downhole tools according to claim 1, wherein the degradable polymer material contains at least one rubber material selected from the group consisting of urethane rubber, acrylic rubber, polyester-based thermoplastic elastomer, polyamide-based thermoplastic elastomer, natural rubber, isoprene rubber, ethylene propylene rubber, butyl rubber, styrene rubber, aliphatic polyester rubber, and chloroprene rubber.

9. The degradable seal member for downhole tools according to claim 1, wherein the degradable polymer material contains a polymer material containing a hydrolyzable functional group.

10. The degradable seal member for downhole tools according to claim 1, wherein the degradable polymer material contains a polymer material containing at least one urethane bond, ester bond, or amide bond.

11. The degradable seal member for downhole tools according to claim 1, wherein the degradable polymer material contains from 0.1 to 20 parts by mass of a degradation accelerator relative to 100 parts by mass of the degradable polymer material.

12. The degradable seal member for downhole tools according to claim 11, wherein the degradation accelerator contains at least one type selected from the group consisting of organic acids, inorganic acids, organic acid esters, inorganic acid esters, and acid anhydrides.

13. The degradable seal member for downhole tools according to claim 1, wherein the degradable polymer material contains a reinforcing material.

14. A plug for well drilling comprising:
a mandrel, and
at least one degradable seal member for downhole tools described in claim 1 disposed on an outer circumferential surface orthogonal to an axial direction of the mandrel.

15. The plug for well drilling according to claim 14, wherein the mandrel is formed from a degradable material.

16. The plug for well drilling according to claim 15, wherein the degradable material is polyglycolic acid.

17. The plug for well drilling according to claim 14, wherein the degradable material contains a reinforcing material.

18. The plug for well drilling according to claim 14, wherein the mandrel is formed from a composite material containing a degradable material.

19. A method for well drilling comprising: sealing a borehole using a downhole tool comprising the degradable seal member for downhole tools described in claim 1, and then the degradable seal member for downhole tools being degraded inside the borehole.

20. A method for well drilling comprising: performing a well treatment using a downhole tool comprising the degradable seal member for downhole tools described in claim 1, the degradable sealing member for downhole tools abutting another member for downhole tools, and then the degradable seal member for downhole tools being degraded inside the borehole.

* * * * *